United States Patent
Kim et al.

(10) Patent No.: US 9,054,961 B1
(45) Date of Patent: Jun. 9, 2015

(54) SETUP OF MULTIPLE IOT DEVICES

(71) Applicant: Belkin International Inc., Playa Vista, CA (US)

(72) Inventors: Ryan Yong Kim, Rolling Hills Estates, CA (US); Venkata Subba Rao Pathuri, Alpharetta, GA (US)

(73) Assignee: Belkin International Inc., Playa Vista, CA (US)

( * ) Notice: Subject to any disclaimer, the term of this patent is extended or adjusted under 35 U.S.C. 154(b) by 0 days.

(21) Appl. No.: 14/529,619

(22) Filed: Oct. 31, 2014

Related U.S. Application Data

(63) Continuation of application No. 14/479,545, filed on Sep. 8, 2014.

(51) Int. Cl.
| | |
|---|---|
| *G06F 15/16* | (2006.01) |
| *H04L 12/24* | (2006.01) |
| *H04L 29/08* | (2006.01) |
| *H04W 84/12* | (2009.01) |
| *H04W 4/02* | (2009.01) |

(52) U.S. Cl.
CPC .......... *H04L 41/0806* (2013.01); *H04L 67/141* (2013.01); *H04W 84/12* (2013.01); *H04W 4/025* (2013.01); *H04W 4/02* (2013.01); *H04W 4/023* (2013.01)

(58) Field of Classification Search
CPC ........ H04W 4/02; H04W 4/023; H04W 4/025
USPC ................................. 709/200–203, 217–227
See application file for complete search history.

(56) References Cited

U.S. PATENT DOCUMENTS

| | | | | |
|---|---|---|---|---|
| 7,849,173 | B1 * | 12/2010 | Uhlik | 709/223 |
| 7,849,177 | B2 * | 12/2010 | Uhlik | 709/223 |
| 8,244,223 | B2 * | 8/2012 | Farah | 455/414.1 |
| 8,331,544 | B2 * | 12/2012 | Kraus et al. | 379/127.01 |
| 8,392,585 | B1 * | 3/2013 | Balwani | 709/228 |
| 8,521,859 | B2 * | 8/2013 | Uhlik | 709/223 |
| 2010/0220697 | A1 * | 9/2010 | Liu et al. | 370/338 |
| 2010/0318685 | A1 * | 12/2010 | Kraus et al. | 709/249 |
| 2013/0191897 | A1 * | 7/2013 | Lindteigen et al. | 726/6 |
| 2013/0331127 | A1 * | 12/2013 | Sabatelli et al. | 455/456.3 |
| 2014/0280865 | A1 * | 9/2014 | Albertson et al. | 709/224 |
| 2015/0023339 | A1 * | 1/2015 | Erickson et al. | 370/338 |

* cited by examiner

*Primary Examiner* — Moustafa M Meky
(74) *Attorney, Agent, or Firm* — Kilpatrick Townsend & Stockton LLP

(57) ABSTRACT

The present disclosure relates to the setup of multiple devices on a local area network. Specifically, various techniques and systems are provided for utilizing a network device to efficiently add a new device to a local area network using an existing network device. Exemplary embodiments of the present invention include a computer-implemented method. The method comprises receiving, at a network device on a network, credentials identifying a network gateway in the network; receiving a communication including an indication that a new network device has generated a new access point; transmitting a query, wherein the query includes a request to determine whether the new network device is associated with the network; receiving a communication including a response to the query indicating that the new network device is associated with the network; establishing a connection with the new access point of the new network device; and transmitting the credentials identifying the network gateway, wherein the credentials are used for the new network device to join the network.

24 Claims, 23 Drawing Sheets

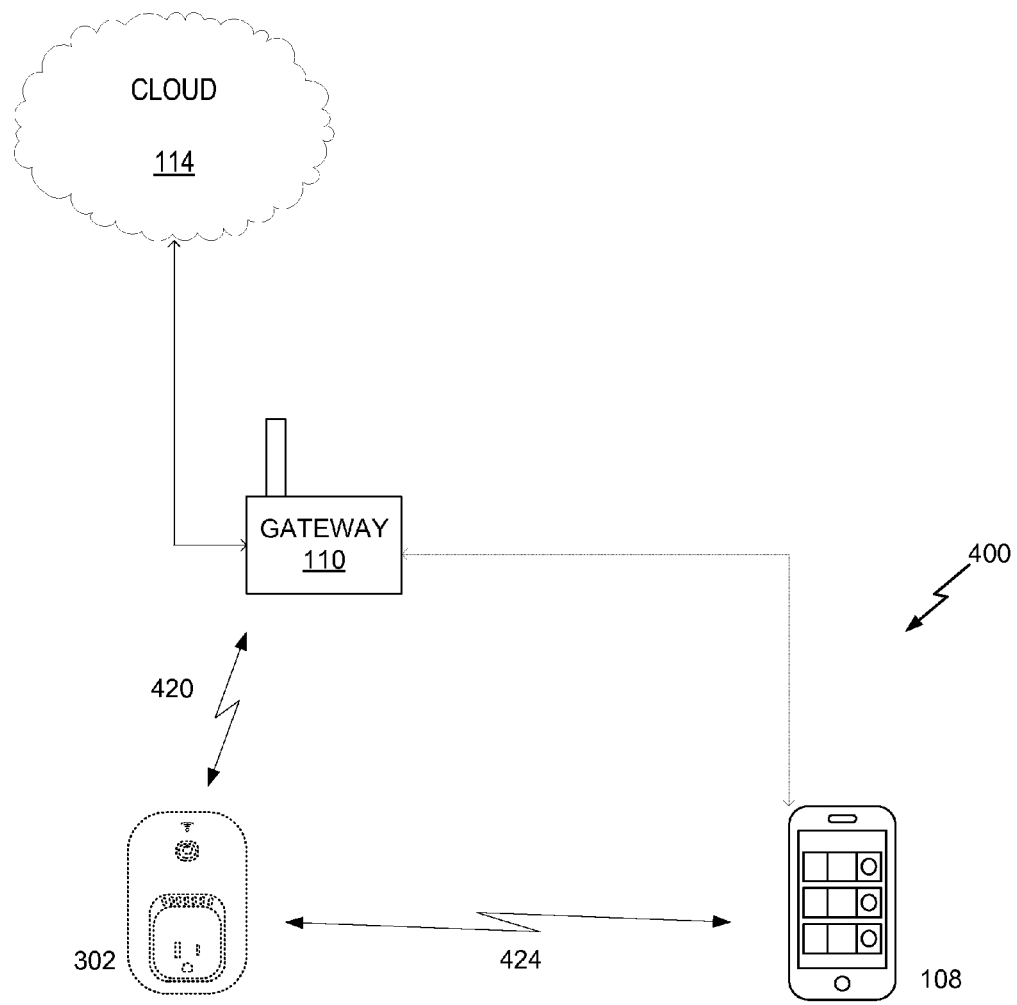
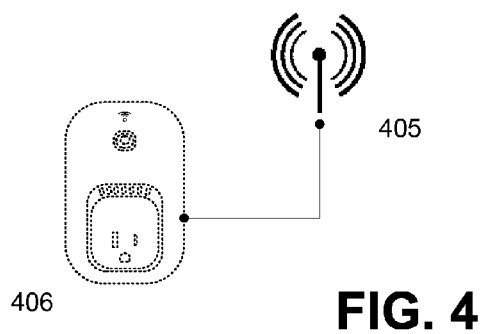
FIG. 4

SETUP OF MULTIPLE IOT DEVICES

CROSS-REFERENCE TO RELATED APPLICATIONS

This application is a continuation of U.S. application Ser. No. 14/479,545, filed Sep. 8, 2014, which is hereby incorporated by reference in its entirety.

FIELD

The present disclosure relates to the setup of multiple devices on a local area network. Specifically, various techniques and systems are provided for utilizing a network device to efficiently add a new device to a local area network using an existing network device.

BRIEF SUMMARY

Exemplary embodiments of the present invention include a computer-implemented method. The method comprises receiving, at a network device on a network, credentials identifying a network gateway in the network; receiving a communication including an indication that a new network device has generated a new access point; transmitting a query, wherein the query includes a request to determine whether the new network device is associated with the network; receiving a communication including a response to the query indicating that the new network device is associated with the network; establishing a connection with the new access point of the new network device; and transmitting the credentials identifying the network gateway, wherein the credentials are used for the new network device to join the network.

Alternative exemplary embodiments of the present invention include a computing device. The computing device comprises one or more processors; and a memory having instructions stored thereon, which when executed by the one or more processors, cause the computing device to perform operations. The operations include receiving a communication including an indication that a new network device has generated a new access point; transmitting a query, wherein the query includes a request to determine whether the new network device is associated with the network; receiving a communication including a response to the query indicating that the new network device is associated with the network; establishing a connection with the new access point of the new network device; and transmitting the credentials identifying the network gateway, wherein the credentials are used for the new network device to join the network.

Alternative exemplary embodiments of the present invention include a non-transitory computer-readable storage medium having instructions stored thereon. When executed by a computing device, the instructions cause the computing device to receive, at a network device on a network, credentials identifying a network gateway in the network; receive a communication including an indication that a new network device has generated a new access point; transmit a query, wherein the query includes a request to determine whether the new network device is associated with the network; receive a communication including a response to the query indicating that the new network device is associated with the network; establish a connection with the new access point of the new network device; and transmit the credentials identifying the network gateway, wherein the credentials are used for the new network device to join the network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 4 is an illustration of an example wireless local area network including a network device and an access device in accordance with embodiments of the present invention.

DETAILED DESCRIPTION

Figure 1:
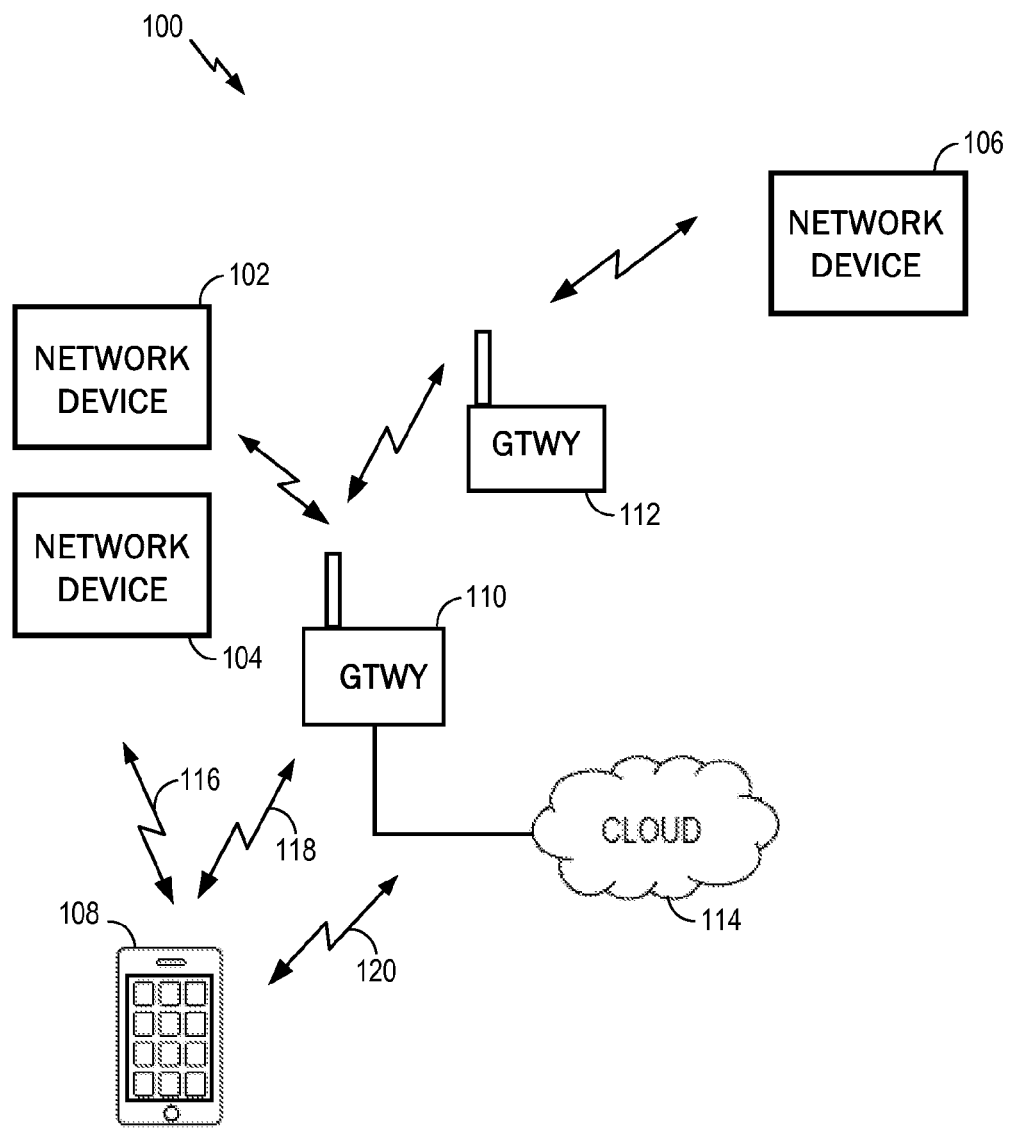
FIG. 1 is an illustration of an example of a wireless network environment in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
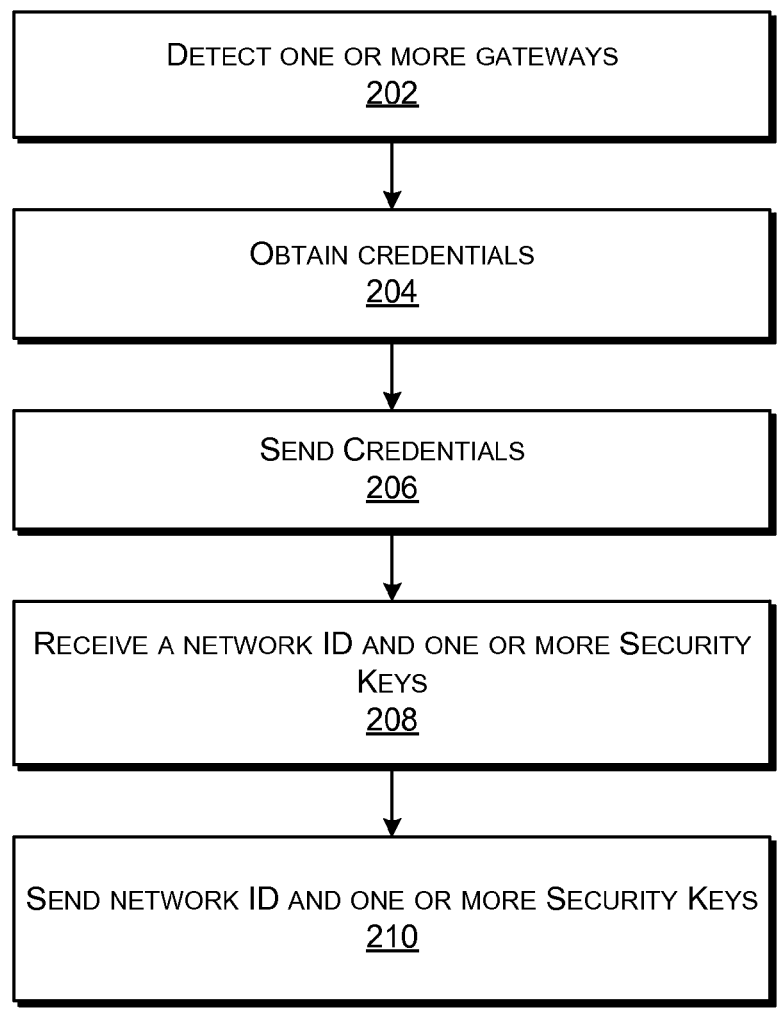
FIG. 2 is a flowchart illustrating an embodiment of a process for registering one or more network devices in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC–SHA1(PrivateKey, StringToSign)). The Signature value may include an alphanumeric or numeric string. HMAC–SHA1 is an open source technique that includes a Hash-based Message Authentication Code (HMAC) using a SHA1 hash function. The HMAC–SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64 (HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

As noted, a server (e.g., a cloud network server) may register the first gateway as a first logical network with a first network ID and may generate a first set of security keys for a first network device and an access device. A second network device may then be registered and authorized to join the network using a similar process as that for the first network device, as described. For example, the second network device may communicate with and obtain credentials from the gateway as part of the registration process. The second network device may obtain the credentials after, for example, a user has received a display list of the network devices on, for example, the access device and the user has chosen the second network device or otherwise indicated to the system that the second network device, similar to the first network device, is associated with the network. However, exemplary embodiments of the present invention may provide a more efficient way to help the second network device join the network. For example, the first network device, which has already joined the network, may authorize and/or authenticate the second network device and subsequently provide the second network device with the appropriate credentials to join the network.

Figure 3:
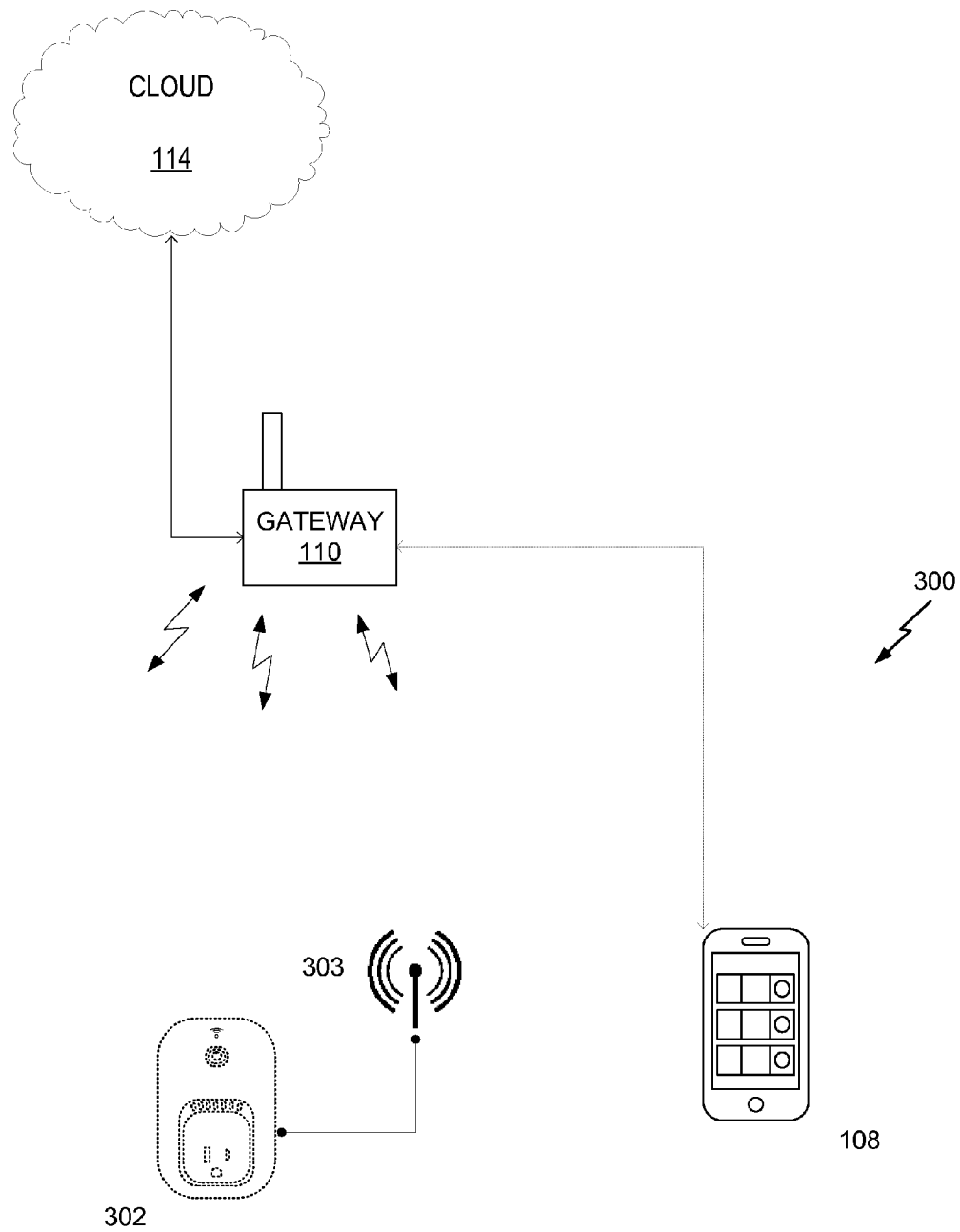
FIG. 3 is an illustration of an example wireless local area network including a plurality of network devices in accordance with embodiments of the present invention.

FIG. 3 illustrates an example of a wireless local area network including a network device, according to embodiments of the present invention. Local area network 300 includes a network device 302. FIG. 3 also includes an access device 108, which may connect to local area network 300 and may be used to control network devices on local area network 300, including, for example, network device 302. As noted, in some embodiments, the network device 302 may include home automation network devices that allow a user to access, control, and/or configure various home appliances located within the user's home, such as a television, radio, light, microwave, iron, and/or the like, as described further with respect to FIG. 1.

As shown in FIG. 3, and as described previously with respect to FIG. 2, network device 302 may, upon being powered on or reset to factory settings, send or broadcast identification information to the rest of the local area network (including, for example, access device 108). More specifically, network device 302 may generate a setup access point, such as setup access point 303. A setup access point, such as for example a wireless access point, is a device that allows wireless devices to connect to a network using WiFi or other standards. The identification information may be sent in response to a discovery request from the access device 108. The identification information may also be sent as an automatic component of being powered on for the first time or reset. In some cases, the identification information may include a name of the network device or other identification information.

An application, program, or the like that is installed on and executed by the access device may receive the identification information from the network device via communication path 424 (as shown in FIG. 4). When the application on the access device is launched by a user, the access device may display the identification information for selection by the user. Once the network device identification information is selected, the network device may send to the access device a list of gateways (e.g. SSIDs) that are detected by the network device via communication path 424. The access device may receive and display the list of gateways. The user may select the gateway with which the user wishes for the network device to pair. The access device may then prompt the user to enter login information that is required for accessing the network signals provided by the gateway. Once the user has entered login information, the access device may send the login information to the network device, also via communication path 424. The network device may use the login information to pair with the selected gateway. As one example, network device 302 may be paired with gateway 110. Once paired with a gateway, such as gateway 110, the network device may communicate with gateway 110 via communication path 420. The network device may also then be registered with a cloud network (e.g., cloud network 114), as described herein, for example, with respect to FIG. 2.

FIG. 4 illustrates an example of a wireless local area network 400 including multiple network devices, according to embodiments of the present invention. Local area network 400 includes network device 302 and a new network device 406. Network device 302 is paired with gateway 110, as described with respect to FIG. 3. Network device 302 is also communicatively coupled to access device 108, as described with respect to FIG. 3. New network device 406, similar to network device 302, upon being powered on or reset to factory settings, may transmit/send or broadcast identification information to access device 108 and/or the rest of local area network 400. For example, network device 406 may generate a setup access point, such as setup access point 405, similar to setup access point 303 with respect to network device 302. Setup access point 405 may transmit one or more communications (e.g. beacons or beacon frames) containing identification and other information. The communications, which may include identification information about the new network device 406, may represent the intent or desire of the new network device to join the network 400. In addition or alternatively, a communication from the existing network device 302 to the new network device 406 (or to the setup access point 405 of the new network device 406) may represent the intent or desire of the existing network device 302 (or the intent/desire of the network as a whole) for the new network device 406 to join the network.

The communications may be in the form of beacons if, for example, the local area network 400 is a WiFi network. However, embodiments of the present invention may be implemented within other kinds of networks, such as Bluetooth® signals, Zigbee® signals, Ultra-Wideband (UWB) signals, and/or the like. Therefore, network device 406 (or network device 302) may transmit management frames or other protocols other than beacon frames, such as those associated with the particular type of network being used. While embodiments of the present invention may be described with respect to the use of WiFi and beacons being sent to transmit identification and other information from a setup access point to an access device and/or a network device, it is understood that such other protocols may be used with respect to those embodiments.

For example, various other methods of conveying information, such as SSID/password information, may be used. Exemplary methods of such conveying of information include near field communications (NFC), RFID, Bluetooth, ultrasonic sensors, gestures, etc. Furthermore, either one device may recognize a signal from another device, indicating a desire to transmit/transfer such information. For example, one device may include a blinking light, a barcode, a fan, etc. For example, a fan in one device may speed up, slow down, start up, stop, etc. in a certain pattern that is recognizable to the other device. In fact, each device may include a slightly different fan speed (e.g. in RPM) that the other device may recognize. As another example, the transmitting device may simply come into contact or "tap" the receiving device to transmit the information, or vice versa. Various other methods of communicating such information from device to device are contemplated within the scope of embodiments of the present invention.

Setup access point 405 may transmit communications, such as beacons, containing various information, including identification information of the device, identification information of the network, a timestamp, information indicating network bandwidth/latency or other capability information, among other information. For example, beacon frames may be transmitted periodically to announce the presence of network device 406. For example, upon being powered on or reset to factory settings, network device 406 may transmit, via setup access point 405, a beacon frame to announce its presence to the other devices on local area network 400. Otherwise, when powered on or reset, network device 406 may not know how to communicate with any other device and/or how to usefully communicate with any network to reach such devices.

As described with respect to network device 302, an application, program, or the like that is installed on and executed by access device 108 may receive the identification information from network device 406. Since access device 108 may not be within range of local area network 400 at any given time, access device 108 may communicate with local area network 400, including with network device 302, via cloud network 114 or through other means. Network device 302 may also receive the identification information from network device 406. For example, network device 302, since it has already connected to and joined the local area network 400, may receive a communication (e.g. a beacon) from a new network device, such as network device 406, anytime one is sent. Therefore, network device 302 may assist network device 406 with the process of inquiring with the rest of local area network 400 to determine if network device 406 should be connected to the network, and the process of providing network device 406 with the appropriate network credentials for network device 406 to connect to the network.

In contrast to the setup process for network device 302, as described above with respect to FIG. 2, the setup process for network device 406 (i.e. the process of connecting network device 406 to local area network 400) may not require a user to input a password or other credentials. In other words, using already connected network device 302 to assist in connecting network device 406 to local area network 400, network device 406 may be set up using an accountless authentication and/or authorization process, as described below with respect to FIGS. 5 and 6.

The terms "authorization" and "authentication" or variations thereof may be used herein. The term "authorization" may be used to describe permission, or for example a process of confirming that a network device is allowed to join a network. The term "authentication" may be used to describe a confirmation of identity, or for example a process of confirming that the network or network device attempting to connect to (or join) a network or network device is the correct or intended network or network device. For example, a network device may be authenticated before it is allowed to join a network to confirm that the device is associated with the network, and it may thereafter be authorized, or allowed, to join the network. In an alternative embodiment, a network may be authenticated to confirm to a new network device that the network is the network it intended to join when the network device communicated with (or connected to) the network.

As noted, network device 302 may receive a communication (e.g. a beacon) from a new network device, such as network device 406, anytime one is sent. In another example, network device 302, and any other network devices that have already joined the network, may continuously listen for beacons (or other types of communications) such as those transmitted by setup access point 405. Network device 302 may continuously listen for such beacons to keep itself and the rest of local area network 400 informed of any new device that has powered up, been reset, or otherwise wants to connect to local area network 400. In another example, instead of continuously listening or looking for communications sent by a new network device, network device 302 or other network devices may periodically send their own communications or other communications to the rest of the network to indicate to any new network device that intends to join the network that the network is open to a new network device joining the network. Either mode, whether the network device continuously listens for communications from setup access points of new network devices or whether the network device sends a communication looking for new network devices, may be turned on or off to save power, prevent access by an unwanted foreign entity, prevent leaking of credentials, among others. Furthermore, a user may decide to only turn on one of these modes when they know that a new network device is present within range of the network that it knows is associated with the network and wants to join the network.

Figure 5:
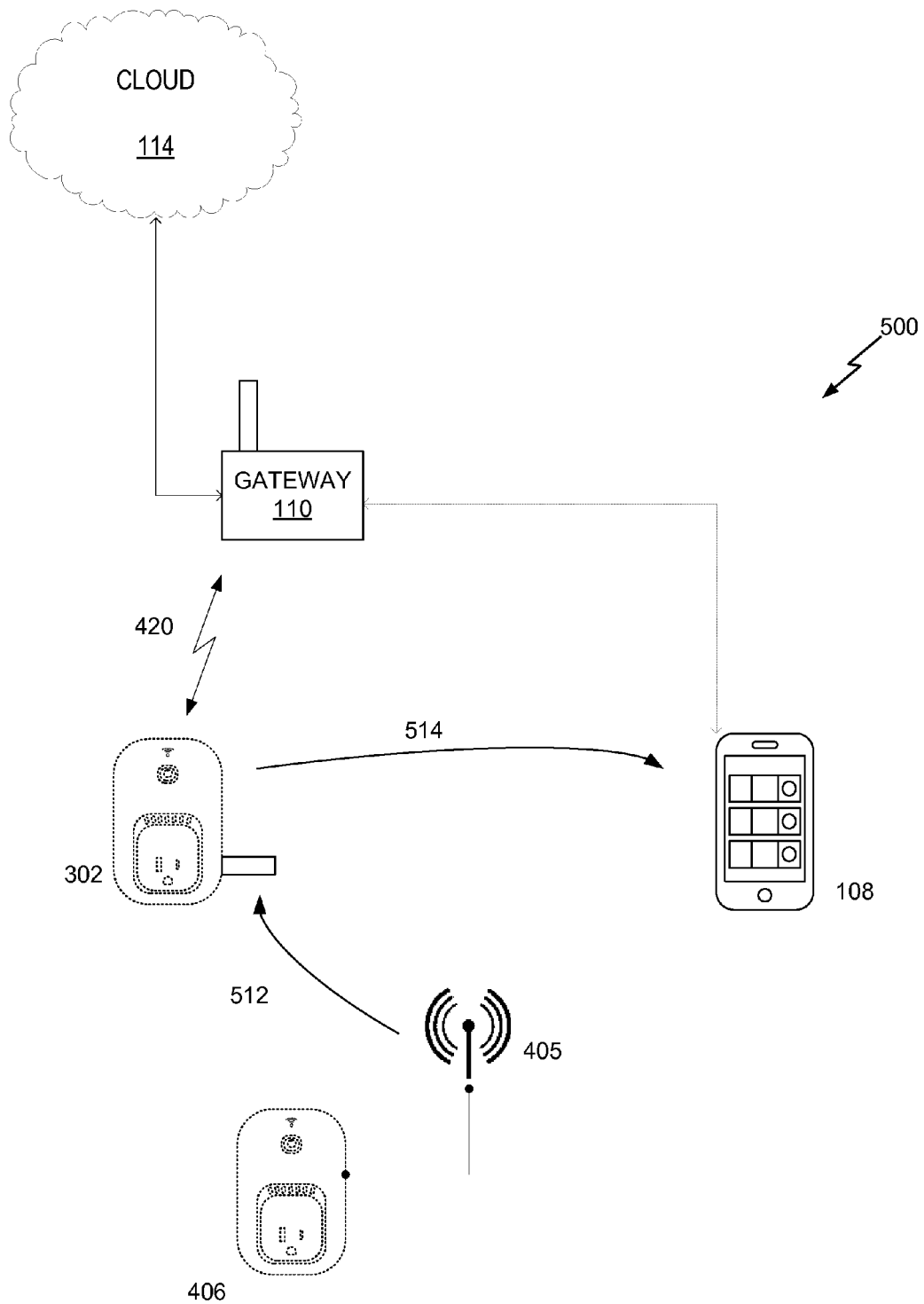
FIG. 5 is an illustration of an example wireless local area networks including multiple network devices and communication between the same, according to embodiments of the present invention.
Figure 6:
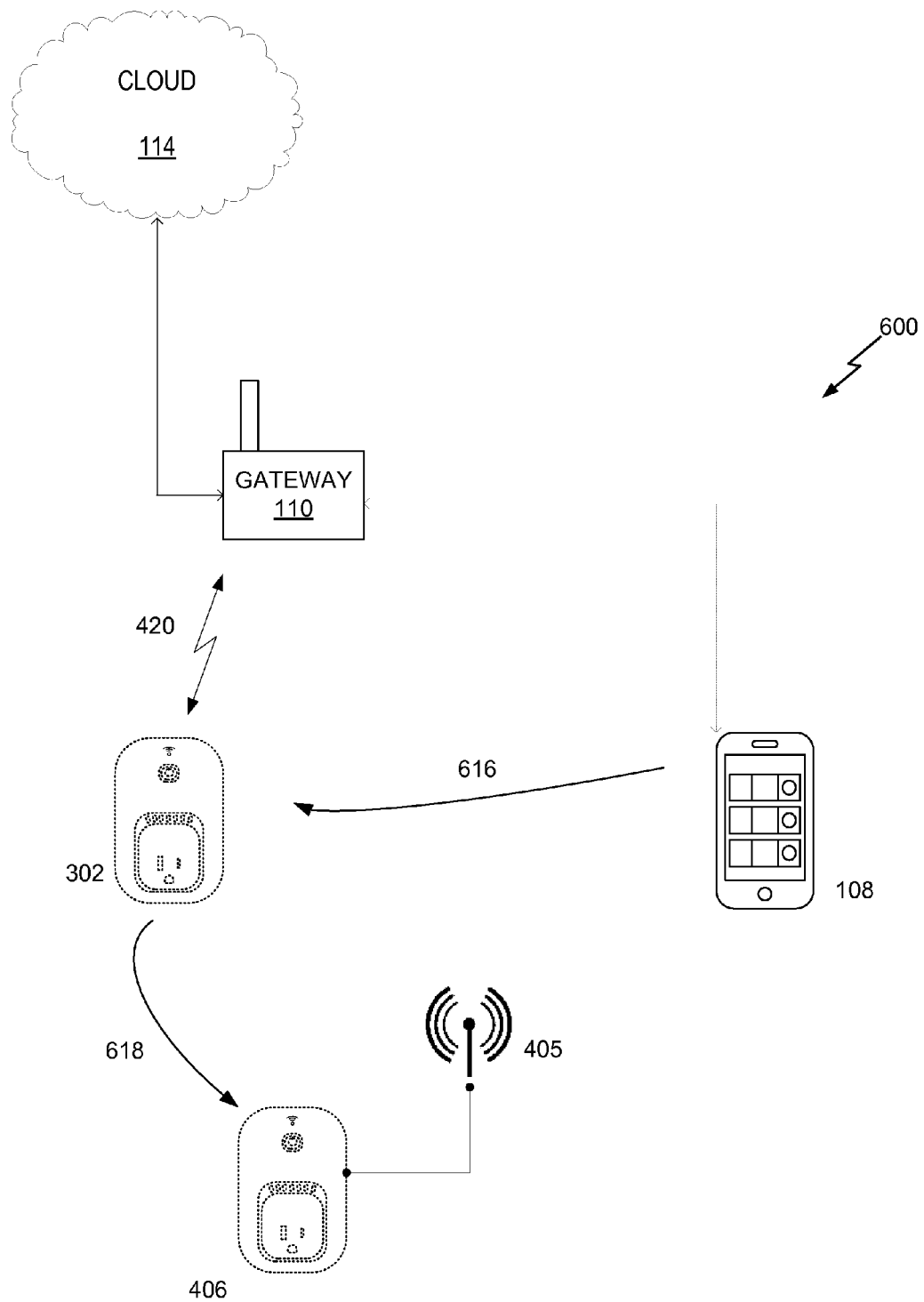
FIG. 6 is an illustration of an example wireless local area networks including multiple network devices and communication between the same in accordance with embodiments of the present invention.

FIGS. 5 and 6 illustrate example wireless local area networks including multiple network devices and communication between the same, according to embodiments of the present invention. As shown in FIG. 5, network device 302 may receive a communications (e.g. a beacon) from setup access point 405 via communication path 512. For example, as shown in FIG. 5, network device 302 (similar to other network devices such as network device 406) may include a wireless antenna to receive such communications from setup access point 405 wirelessly. However, other types of communication other than wireless may be used for transmission of such communications.

As noted, new network device 406 may transmit a communication, such as a beacon, including identification information about itself. The communication(s), which may include identification information about the new network device 406, may represent the intent or desire of the new network device to join the network 400. After new network device 406 has transmitted a communication, that communication may be detected by network device 302 (or by other devices on the network 500). Receipt of such an indication of intent or desire from the new network device 406 may allow the existing network device 302 to begin the process of joining the new network device 406 onto the network 500. Also as noted, in addition or alternatively, a communication from the existing network device 302 to the new network device 406 (or to the setup access point 405 of the new network device 406) may represent the intent or desire of the existing network device 302 (or the intent/desire of the network as a whole) for the new network device 406 to join the network. Receipt of such an indication of intent or desire from the existing network device 302 may allow the new network device 406 to indicate to the existing network device 302 (or otherwise indicate to the network 500) that it agrees with that intent or desire and would like to join the network as well. Such a set of communications may allow the existing network device 302 to begin the process of joining the new network device 406 onto the network 500.

After network device 302 has detected/received a transmitted communications from setup access point 405, network device 302 may transmit a communication to access device 108 including an indication that a new network device, e.g. network device 406, has been found. Network device 302 may also transmit a communication, indicating that network device 406 has been found, to gateway 110 and/or cloud network 114 and/or other devices on local area network 500. The communication sent from network device 302 to access device 108 may also include a query to access device 108 to determine whether (new) network device 406 should have access to local area network 500. In other words, network device 302 communicates with access device 108 to confirm whether network device 406 is a "known" device (e.g. is associated with the network) or should be allowed to join the local area network 500 or should be sent any information about the network that may allow network device 406 to connect to the network.

After network device 302 communicates with access device 108 to confirm whether network device 406 should be allowed to join the local area network 500 such that network device 406 is associated with local area network 400, access device 108 may present/display a query to a user of access device 108 requesting an input regarding whether the user wants network device 406 to be connected to local area network 500. Examples of such displays are described further herein with respect to FIGS. 8-10. However, the process of using a displayed query and subsequent user response to confirm that new network device 406 is associated with local area network 500 is not required for embodiments of the present invention. In other words, other methods exist to confirm that new network device 406 is associated with local area network 500. For example, one or more device on local area network 500 may have a stored list of devices that are associated with local area network 500 so that network device 302 or access device 108 or another device on the network may automatically confirm/authenticate that network device 406 is associated with local area network 500 or that network device 406 should be allowed to join local area network 500. Such a list may also be stored on cloud network 114.

As shown in FIG. 6, access device 108 may transmit a communication to network device 302, via communication path 616, indicating that network device 406 is or is not intended (e.g. by the user) to be connected to local area network 600. Such a communication including an indication of whether network device 406 is associated with the network or has been accepted/allowed to join the network by a user may be transmitted directly after a user inputs a response to the displayed query from access device 108 testing an input regarding whether the user wants network device 406 to be connected to local area network 600. After network device 302 receives a communication from access device 108 that new network device 406 is associated with local area network 600, network device 302 may pair with network device 406 (e.g. connect to setup access point 405 so as to communicatively connect/couple to network device 406 via setup access point 405). Generating a connection/pairing between network device 302 and new network device 406 allows for network device 302 to share information, data, etc. with new network device 406, including but not limited to network credentials.

As noted, after network device 302 receives a communication (e.g. from access device 108) that new network device 406 is associated with local area network 600, network device 302 may pair with network device 406. More specifically, network device 302 may connect to setup access point 405 so as to communicatively connect/couple to network device 406 via setup access point 405. Such a connection/pairing may be accomplished in multiple different ways. For example, setup access point 405 could be setup to use a "well known" SSID and/or password that allows any device to connect to it securely. In such a circumstance, network device 302 may obtain the well-known SSID and password and use the SSID and password to connect to the setup access point. Using such an SSID and password would allow the connection between network device 302 and new network device 406 to be secure. A secure connection may be important if, for example, network device 302 wants to assist new network device 406 to join network 600 and sends the network's credentials (e.g. the network's SSID and password) to new network device 406 via that connection. Such a secure connection may prevent a foreign device from capturing the information transmitted across the connection. In an alternative embodiment, setup access point 405 could be setup to be "open" such that any device may connect to it without the need for the setup access point's SSID and/or password.

Therefore, after network device 302 is communicably coupled to new network device 406, network device 302 may send network credentials for one or more of the gateways (e.g. gateway 110) in local area network 600 (e.g. a network identifier (ID), security key(s), a service set identification (SSID), a media access control (MAC) address, and/or the like) for local area network 600. Obtaining such network credentials allows new network device 406 to locate and pair with/connect to gateway 110, or in other words to join local area network 600.

Figure 7:
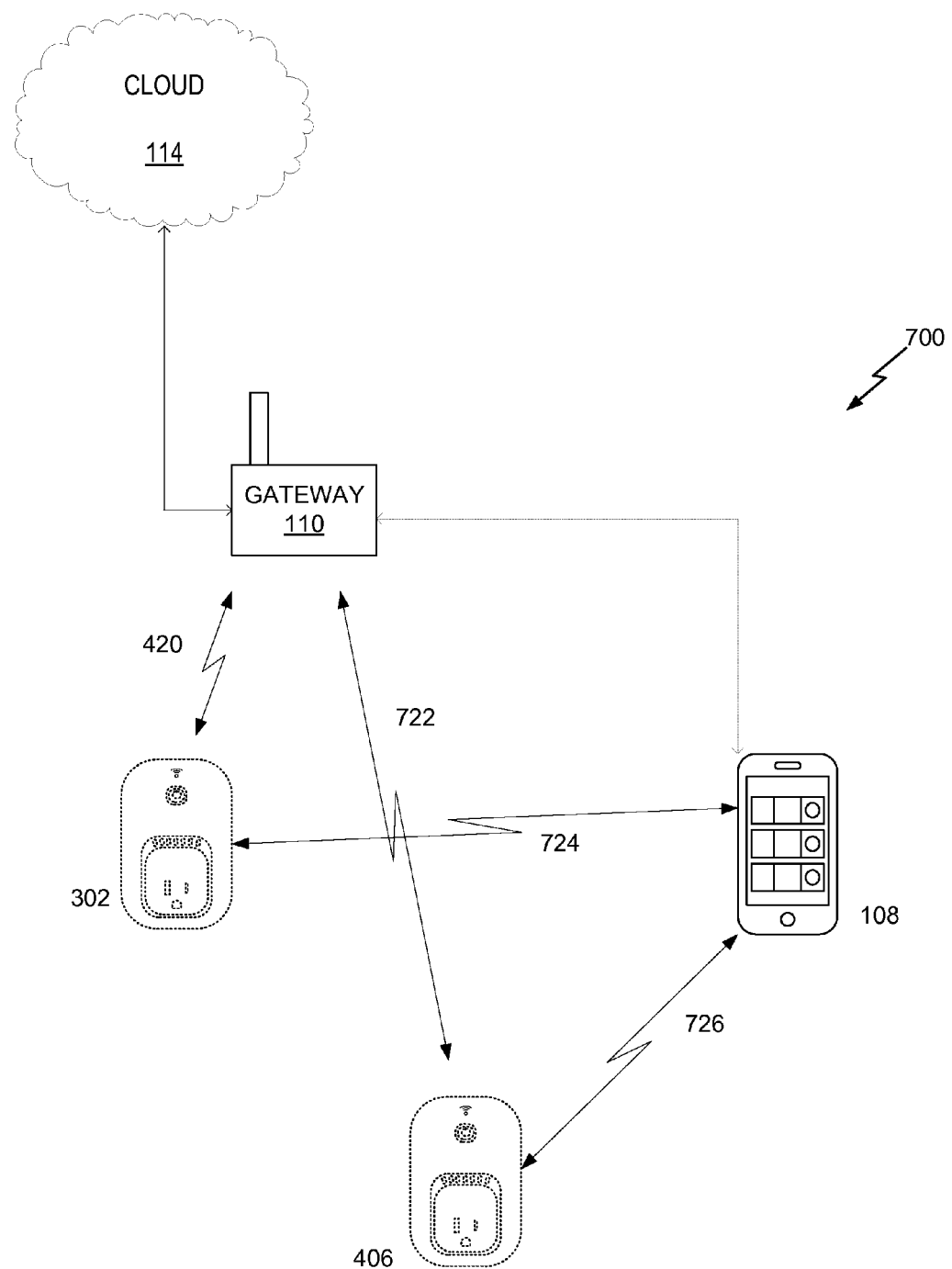
FIG. 7 is an illustration of an example wireless local area networks including multiple network devices and communication between the same in accordance with embodiments of the present invention.

As shown in FIG. 7, which illustrates an example of a wireless local area network 700 including multiple network devices according to embodiments of the present invention, network device 406 has a communication path with gateway 110, which allows network device 406 to communicate with any device on the local area network 700 (similar to network device 302 with communication path 420). Furthermore, once network device 406 has joined local area network 700, access device 108 may be used to control network device 406 similar to its control of network device 302. A user may interact with the network device 406 using an application, a web browser, a proprietary program, or any other program executed and operated by the access device 108. In some embodiments, the access device 108 may communicate directly with the network device 406 (e.g., communication or communication signal/path 726), similar to its communication with network device 302 (e.g., communication or communication signal/path 724). In some embodiments, the access device 108 may communicate with the network device 406 via the gateways 110 (e.g., communication path 722) and/or the cloud network 114.

Figure 8:
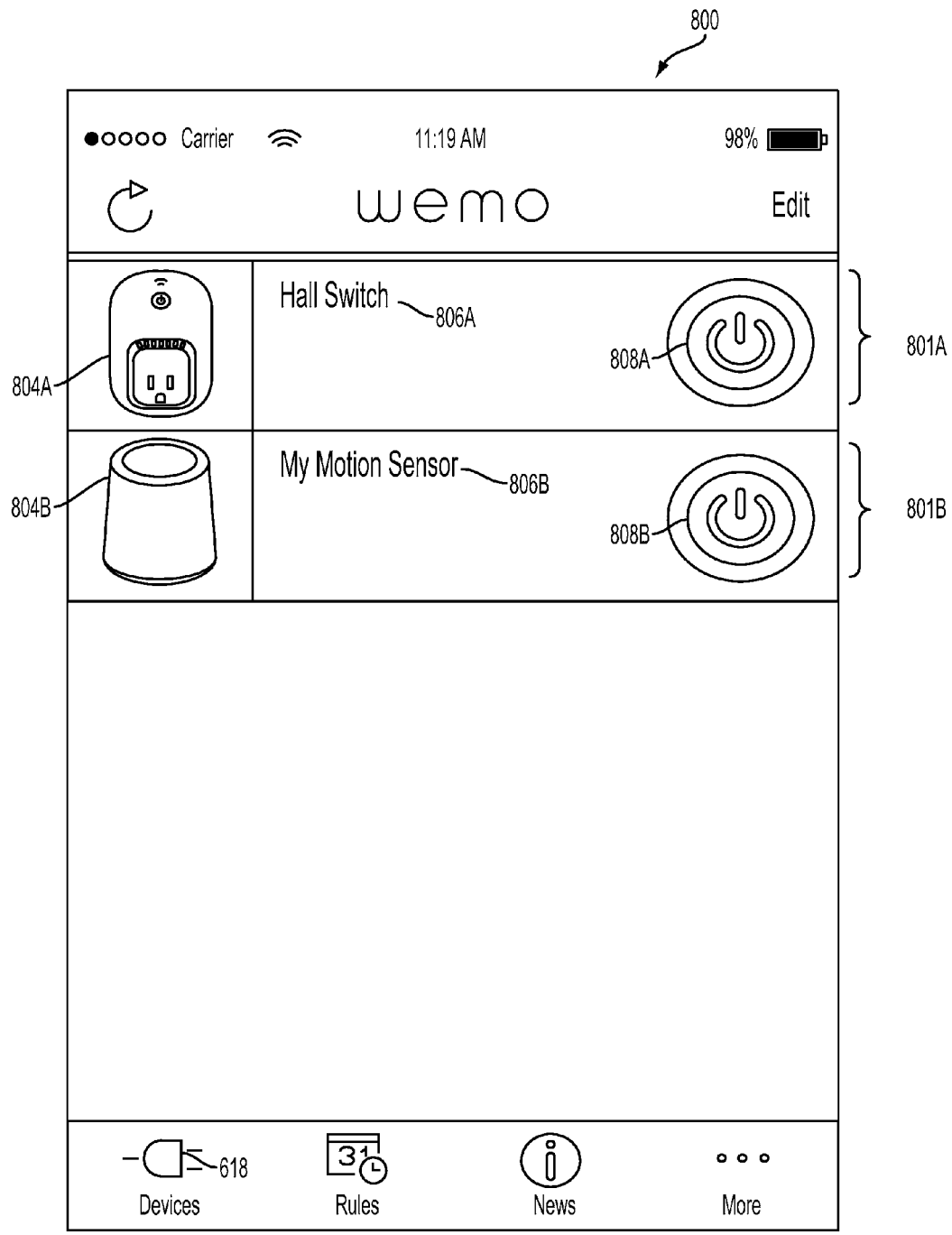
FIG. 8 is an illustration of an exemplary user interface display for an application on an access device in accordance with embodiments of the present invention.
Figure 9:
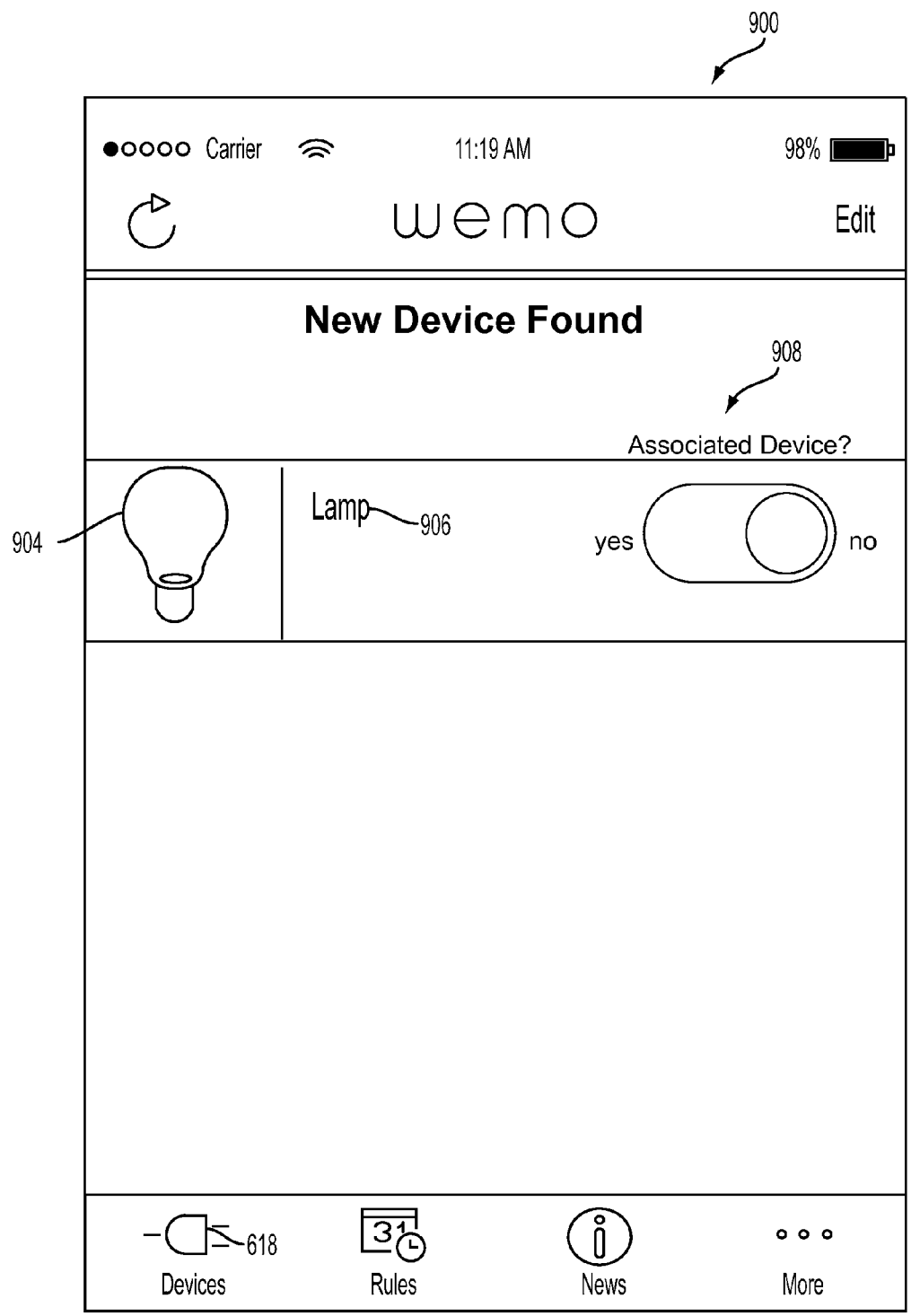
FIG. 9 is an illustration of an exemplary user interface display for an application on an access device in accordance with embodiments of the present invention.
Figure 10:
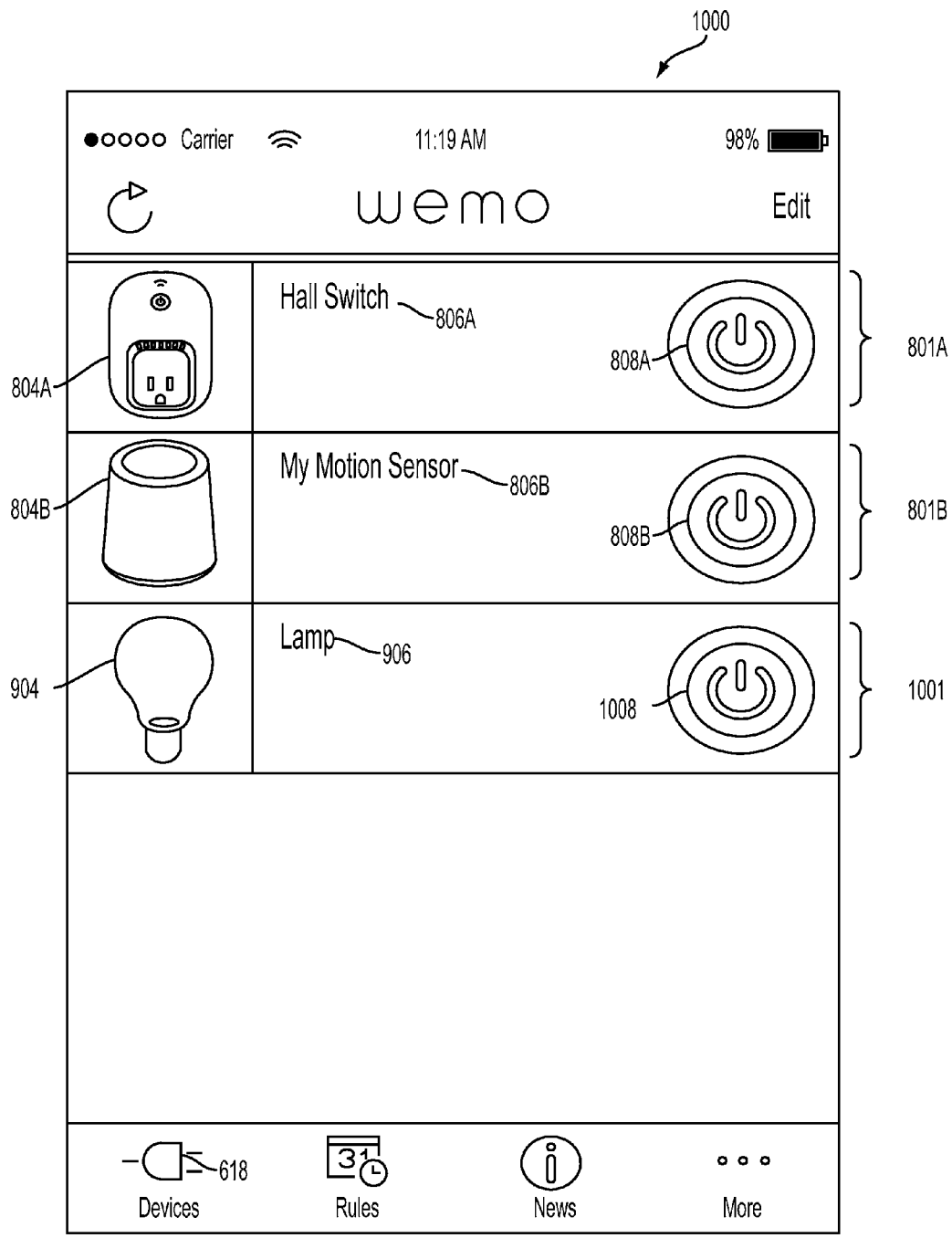
FIG. 10 is an illustration of an exemplary user interface display for an application on an access device in accordance with embodiments of the present invention.

FIGS. 8-10 illustrate exemplary embodiments of screenshots of an exemplary user interface (UI) display for an application on an access device, according to embodiments of the present invention. However, the exemplary UIs are not limited to these example embodiments. In an embodiment of the invention, the visual interfaces illustrated in FIGS. 8-10 are displayed on a mobile computing device, which can have a touch sensitive (i.e., touch screen) display device. For ease of explanation, the monitoring and control operations discussed below with reference to FIGS. 8-10 are described in the context of an application executing on an access device 108 with a touch-screen display device. However, the operations are not intended to be limited to the exemplary device shown in FIGS. 8-10. It is to be understood that the user interfaces illustrated in the exemplary embodiments of FIGS. 8-10 can be readily adapted to be rendered on displays of a variety of computing device platforms running a variety of operating systems. Throughout FIGS. 8-10, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 8 illustrates an exemplary user interface display 800 for an application on an access device, according to embodiments of the present invention. FIG. 8 discloses a list of two exemplary network devices, including devices 804A and 804B, which have displays 801A and 801B assigned to devices 804A and 804B respectively. Device 804A is connected to a hall switch 806A and device 804B that is connected to a motion sensor 806B. Device 804A can be turned on by a user by pressing button 808A and device 804B can be turned on by a user by pressing button 808B.

FIG. 9 illustrates another exemplary user interface display 900 for an application on an access device, according to embodiments of the present invention. As noted with respect to FIG. 3, network device, for example network device 302, may communicate with access device 108 to confirm whether a network device should be allowed to join the local area network such that a new network device, for example new network device 406 as shown in FIGS. 4-7, is associated with the local area network. As such, access device 108 may present/display a query 910 ("Associated Device?") to a user of access device 108 requesting an input regarding whether the user wants the new network device to be connected to the local area network. The user may use the query switch to select "yes" or "no" to the query to indicate to the access device whether the newly recognized device should be associated with the local area network such that the device should be allowed to join the network. After the user inputs an answer to the query into the UI display of the access device, access device 108 may transmit a communication to network device 302 indicating that the new network device is or is not intended (e.g. by the user) to be connected to the local area network. Thereafter, as noted with respect to FIG. 6, after network device 302 receives a communication from access device 108 that the new network device is associated with the local area network, network device 302 may pair with network device 406 and continue the process of joining the new network device with the local area network.

FIG. 10 illustrates another exemplary user interface display 1000 for an application on an access device, according to embodiments of the present invention. FIG. 10 discloses a list of exemplary network devices, including devices 804A and 804B, which have associated displays 801A and 801B respectively, as shown in FIG. 8. FIG. 10 also discloses a display 1001 associated with the new network device, network device 904 that is connected to lamp 906. Display 1001 may appear on UI display 1000 after network device 904 has joined the local area network (and therefore after a user enters an input to indicate to the access device that the newly recognized device is be associated with the local area network such that the device should be allowed to join the network). Similar to power button 808A for device 804A and power button 808B for device 804B, the display 1001 for new network device 904 includes power button 1008 for turning lamp 906 on and off.

As described with respect to FIGS. 3-10, when a new network device attempts to join a network, an existing network device or gateway may authorize the new network device to make sure that the new network device is allowed to join the network. For example, as noted with respect to FIG. 3, a network device, for example network device 302, may communicate with access device 108 to confirm whether a network device should be allowed to join the local area network such that a new network device. Examples of such communications/queries are shown in FIGS. 8-10. However, there are multiple different ways that an existing device may authorize a new network device, as described with respect to FIG. 11. Furthermore, the new network device may also authenticate the network to make sure that it is joining the correct network (e.g. the network of the user/owner that also owns the new network device), as described with respect to FIG. 12.

Figure 11:
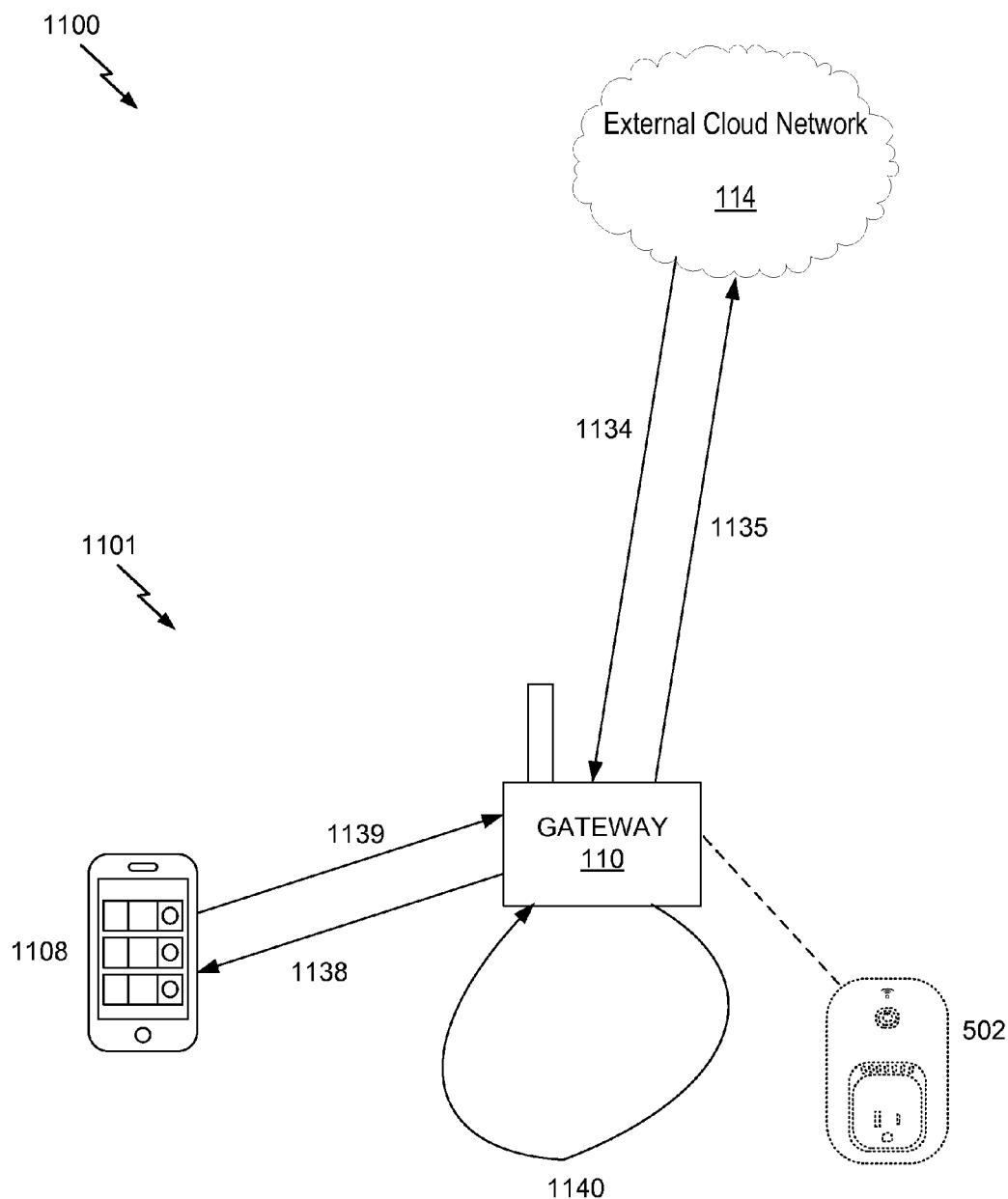
FIG. 11 illustrates an example of a local area network, according to embodiments of the present invention.

FIG. 11 illustrates an example of a system 1100 including a local area network system 1101, according to embodiments of the present invention. The system 1100 includes external cloud network 114 and local area network 1101. Local area network 1101 includes gateway 110, network device 1102, and access device 1108.

As noted, after gateway 110 receives a request to join the local area network, gateway 110 may authorize network device 1102 by confirming that network device 1102 is allowed to join the network. For example, gateway 110 may have previously stored authorization information related to network device 1102. For example, external cloud network 114 may have transmitted/sent information related to network device 1102 to gateway 110. This authorization information may have been stored in the cloud by the user/owner of the cloud/gateway. Alternatively, the cloud may have received/ generated the authorization information from one or more rules associated with authorization of new network devices. For example, the user may set a rule within the network to allow any new network device onto the network, or to allow any new network device of a certain type (e.g. type of device, serial number range, etc.), for example. Such information, received by gateway 110, may include product and customer information related to the customer that purchased a product, such as network device 1102, at a retailer. However, in certain embodiments of the present invention, different retailers may have provided/sold the different devices (although the retailers may have a relationship such that the retailers communicate with each other regarding purchases of such devices). Such information may also include pre-provisioning/authorization information indicating to gateway 110 that network device 1102 is allowed to join local area network 1101. For example, network device 1102 may be authorized because, based on the customer/product information received and/or stored by external cloud 114, network device 1102 was purchased by the same customer as who purchased gateway 110 and/or another network device, and such customer, product, and purchase information was mapped together based on such purchases over time. Alternatively, as noted, such customer/product information may be stored at cloud 114 by the owner of the cloud after purchase of the new network device, or the information may be transmitted by the new network device (either prompted or not prompted by the user/owner) after the new network device is brought home and within range of the network 1101. Therefore, gateway 110 may simply query a storage device within gateway 110 or elsewhere within gateway 110 to confirm that network device 1102 is authorized to join local area network 1101.

However, if gateway 110 does not have local information stored to indicate that network device 1102 is authorized, gateway 110 may capture such authorization information in a different way. For example, gateway 110 may send/transmit a query to external cloud network 114, via communication path 1115, including a request for external cloud 114 to indicate to gateway 110 whether network device 1102 should be allowed/authorized to join local area network 1101. External cloud network 114 may have stored such authorization information because it may have received such information from the user/owner of cloud network 114 or in other ways, as described herein. Alternatively, external cloud network 114 may have received customer/product information and compared such information to previously received customer/ product information such that it knows that a certain customer purchased multiple products that are capable of connecting to each other and/or to the same local area network (e.g. local area network 1101) of the customer. External cloud network 114 may transmit/send a response, e.g. via communication path 1114, to the query from gateway 110 including information indicating whether or not network device 1102 is authorized to join local area network 1101.

Gateway 110 may also send/transmit a query to access device 1108, via communication path 1118, including a request for access device 1108 to indicate to gateway 110 whether network device 1102 should be allowed/authorized to join local area network 1101. For example, gateway 110 may transmit a query, via communication path 1118, to access device 1108 including a request for access device 1108 to indicate to gateway 110 whether network device 1102 should be allowed/authorized to join local area network 1101. Access device 1108 may present, e.g. on a display of access device 1108 (displays shown, for example, in FIGS. 8-10), the query or a similar query to a user of the access device. For example, the user of access device 1108 may be the same customer who purchased network device 1102 (and, for example, who purchased gateway 110) from a retailer. A user may select an answer to the query on access device 1108, and access device 1108 may transmit, e.g. via communication path 1119, an answer to the query to gateway 110 regarding whether the new network device is allowed or authorized to join network 1101. In embodiments of the present invention, gateway 110 may also use a combination of its own storage, external cloud 114, and access device 1108 (and user) to establish authorization of network device 1102 before network device 1102 joins the network.

However, a user may also select an option for gateway 110 to not require authorization to allow a device, such as network device 1102, to join local area network 1101. For example, gateway 110 may include settings such that gateway 110 may allow, without authorization, any device or a subset of all devices to connect to gateway 110 and/or join local area network 1101.

Figure 12:
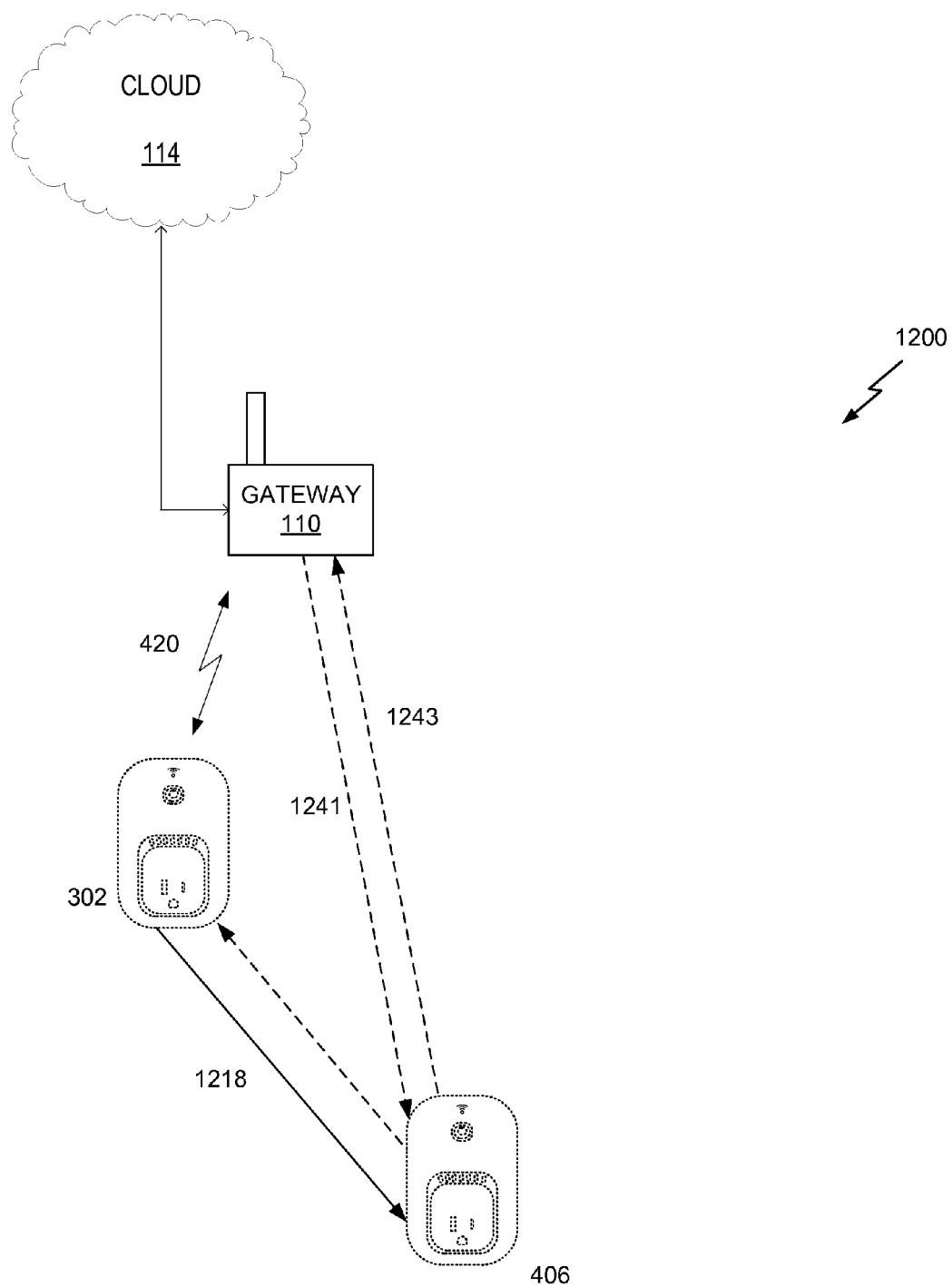
FIG. 12 illustrates an example of a local area network including a network device and a new network device in the process of joining network, according to embodiments of the present invention.

As noted, the new network device may authenticate the network to make sure that it is joining the correct network (e.g. the network of the user/owner that also owns the new network device), as described with respect to FIG. 12. FIG. 12 illustrates an example of a local area network 1200 including a network device 302 and a new network device 406, which may be in the process of joining network 1200, according to embodiments of the present invention.

As noted, network device 406 may connect to gateway 110 after network device 406 is authenticated and/or authorized by gateway 110 using one of several processes of authentication and/or authorization. However, if more than one gateway exists within proximity of network device 406 when network device 406 is turned on or powered up, another gateway in a different network may attempt to connect to new network device 406 and network device 406 may then connect to that other gateway (that other network may be, for example, a neighbor's network or a rogue network trying to steal information from the network). For example, if two gateways (e.g. gateway 110 and a second gateway, not shown) are in the proximity of network device 406, network device 406 may connect to the first gateway to communicate and adopt it onto its network. Such a situation may be undesirable if one of the gateways is owned/controlled by someone other than the purchaser/user of network device 406. Therefore, network device 406 may perform a second step, including authentication of the network, before it connects to network 1200. More specifically, after gateway 110 has authorized network device 406 to confirm that network device 406 should be allowed to join network 1200, network device 406 may authenticate gateway 110 (or network 1200 as a whole) to confirm that network 1200 is the network that it should be connecting to. For example, network device 406 may authenticate gateway 110 (or network 1200 as a whole) to confirm that network 1200 is owned/controlled by the same user or entity that acquired and owns and/or controls network device 406.

As noted, the new network device (e.g. new network device 406) may generate a setup access point, such as setup access point 405 shown in FIG. 5, and after gateway 110 connects to the access point, network device 406 may transmit (e.g. via communication path 616, as shown in FIG. 6) information/data identifying the device, credentials (i.e. private information, such as its SSID and/or MAC address, serial number, or other uniquely identifying information), and/or other information to gateway 110 with a query including a request to join the local area network. However, network device 406 may choose to only transmit a subset of the information that it could otherwise have sent to gateway 110. The information sent from network device 406 to gateway 110 may still be sufficient information about network device 406 such that gateway 110 may authorize (or authenticate, if necessary) new network device 406. For example, gateway 110 may only need one piece of identification information (e.g. one characteristic) about network device 406 to confirm that network device 1102 is authorized/allowed to join network 1200.

In order to authenticate network 1200 (after, for example, gateway 110 has already authorized network device 1102 to join the network), network device 406 may transmit a request or query, for example via communication path 1243, to gateway 110 for a piece/data of the information that it did not transmit to gateway 110. In other words, network device 406 may request that gateway 110 confirm a piece of information/data about network device 1102 that gateway 110 may only be able to receive/obtain from the user or owner of the network, including gateway 110. Gateway 110 may then transmit the request/query to access device 108 so as to allow access device 108 to display the request/query on its display (such as shown, for example, in FIGS. 8-10) for the user/owner to read and respond to. The user may then enter an input into access device 108 in response to the query. The access device 108 may then transmit the user's response to gateway 110 to allow gateway 110 to send the answer to the query back to new network device 406 (for example, via communication path 1241. In an alternate embodiment of the present invention, new network device 406 may transmit its query directly to access device 108 (although the new network device 406 would then need to acquire the location of access device 108 from the network and connect to it) via communication path 1226 and receive a response from the user directly from the access device 108, for example via communication path 1227.

In such an embodiment, the new network device may transmit similar or corresponding information regarding multiple gateways or networks (or queries or requests regarding each gateway or network) that have tried to connect to it to the access device at the same time. In other words, the new network device may have communicated with gateways or other existing devices on multiple networks, and may then attempt to authenticate each of those networks at the same time by asking the user, via the access device, to choose one of the networks for it to connect to. In such an embodiment, the new network device may collect identification information regarding each network before authenticating the network or networks using such a method. The new network device may request such information from each network, or it may have already stored such information from its previous communications with the networks.

In a further alternative embodiment of the present invention, new network device 406 may transmit its query to access device 108 via an existing network device (using, for example, communication path 1219) on network 1200, such as network device 302. Network device 302 may then relay the query to access device 108 similar to how gateway 110 transmitted the query from new network device 406 to access device 108. Network device 302 may then transmit any received response to the query from access device 108 back to new network device 406 via communication path 1218.

As noted, gateway 110 may transmit the request/query, as received from the new network device, to access device 108 so as to allow access device 108 to display the request/query on its display (such as shown, for example, in FIGS. 8-10) for the user/owner to read and respond to. In embodiments of the present invention, gateway 110 may combine such a request/query from the new network device, with the authorization query described with respect to FIGS. 8-10. In other words, gateway 110, or another existing device on the network, may transmit two queries to the access device at the same or similar time. The two queries may include a query for the network to confirm that the user/owner of the network would like to authorize or allow the new network to join the network, and a query, received from the new network device, for the new network device to authenticate the gateway/network and confirm that the new device wants (and the owner/user of the new network device wants the new network device) to join this network. Furthermore, since such queries/requests may be transmitted to the access device, such as access device 108, at the same or similar (substantially the same) time, the queries/requests may be presented to the user of the access device at the same or similar time. In such an embodiment, the user may be able to respond to the queries/requests (e.g. enter an input into the access device) at the same or similar time, causing the access device to transmit the answers received from the user back to the gateway or other existing device at the same or substantially the same time.

The query transmitted by the new network device, which the new network device uses to authenticate the network, may include various types of information about the new network device. For example, the query may include identification information about the new network device that is readily available to the user (e.g. purchaser) of the new network device. The information may be taken from the physical outer shell of the device or from the box that the device was in when purchased (e.g. serial number, UPC code, etc.). Alternatively, the query may include information taken by the user/purchaser when observing the new network device, such as the color or other physical qualities of the device. Further, the information may include a number or code placed on the device or box solely for the purpose of being used in response to a query from the device for authentication. The authentication/query answer may also be in an alternative format that does not require the user to manually enter a code into the access device. For example, the code may be received directly from the access device (e.g. a token or other code) via near-field communication or other transmission protocols. More specifically, the user may access a website run by the manufacturer of the device and enter identifying information about the device so that the website may cause the access device to transmit the correct answer to the device's query to the device (with or without the user actually what the code was before being transmitted to the device). In general, the new network device does not care where the information included in the answer to its query is found or received, as long as the answer is correct. As long as the information withheld by the new network device, the information then requested for by the new network device to a device on the network (e.g. gateway, existing network device or access device/user), is obtained somehow by the network or existing device on the network and used to answer the query or request from the new network device, the new network device can positively authenticate the network. On the other hand, if the information is not obtained by the network and the query is not answered correctly, the new network device may not be able to authenticate the network and may then elect to not join or connect to the network.

If the user (via gateway 110 or access device 108) is able to respond to network device 406 with the correct information/data in response to the request/query from network device 406, then network device 406 can confirm that network 1200 (and gateway 110) is the correct network that it is meant to connect to, or that is controlled by the same user/entity that controls network device 406. If, however, gateway 110 or the access device 108 is unable to respond to network device 406 with the correct information/data in response to its request/query, then network device 406 may determine that the network has failed authentication and that the network that is trying to connect to network device 406 is a foreign or third party network, and it may choose to refrain from connecting to that network. More specifically, network device 406 may then choose to refrain from connecting to a network even though that network has authorized network device 406 to connect to the network.

In an alternative embodiment, gateway 110 may have previously received information, including identification information/data, about new network device 406. For example, cloud network 114 may have previously received information from an external network, such as a retailer cloud network (if, for example, the two cloud networks have an established relationship). More specifically, cloud network 114 may have received information regarding the new network device from a retailer cloud network, where the retailer cloud network is owned or controlled by the retailer that sold the new network device to the user or owner of the new network device and/or the network 1200. In such an embodiment, when the network device 406 transmits identification information to gateway 110, after gateway 110 connects to the network device (or its setup access point), network device 406 may transmit the same or similar information to gateway 110 as gateway 110 had previously received (e.g. from external cloud network 114 i.e. the information received by external cloud network 114 from a retailer, from another device on the network, etc.). The information sent from network device 406 to gateway 110 may be sufficient information about network device 502 such that gateway 110 may compare that information to the information it already has stored to authorize network device 406 to join the network. Therefore, the information retained (and not sent to gateway 110) by network device 406 may include information that should have been known by gateway 110 (e.g. as received from cloud 114 or another external network). The gateway 110 may then answer the query received from the new network device, the query requesting identification information about the new network device to authenticate the network/gateway, without having to send the query to the access device 108 or the user. In other words, such an embodiment removes the user or owner of the access device and the access device itself from the process such that the process for authenticating the network may be fully automated without user intervention.

In alternative embodiments of the present invention, the new network device may use alternative methods of authenticating the network other than transmitting a query to the network. For example, the new network device may take a snapshot of any network and devices on the network(s) it sees, and may also request the existing network device (on the network) to take its own snapshot of the devices/networks it sees in its vicinity. After the existing network device transmits its snapshot to the new network device, the new network device may compare it with its own snapshot of its surrounding area (e.g. networks, network devices, etc.) to determine if it is close enough to the network such that the probability is high that the network is the correct network for it to connect to. More specifically, the new network device may use signal strength relativity or other similar techniques to determine if the networks and devices it sees is similar enough to the corresponding snapshot of the existing network device such that the new network device is close enough to the (existing) network to be the correct network. For example, the if the new network device determines that the snapshot of the network in the vicinity of the existing network device only overlaps slightly (e.g. one device) with the corresponding snapshot of the surrounding network(s) taken by the new network device, the devices are most likely far away from each other. In such a situation, the new network device may determine that the network is not the network that its purchaser intended it to connect to (or, in other words, the "correct" network) and choose not to connect to it. For example, the new network device may use the differences between the network snapshots to determine that the device should not connect to or join the network. Alternatively, if the snapshots of the existing network device and the new network device overlap significantly or in full, the new network device may determine that the it should connect to or join the network. In another alternative embodiment, the new network device may perform an action (e.g. displaying information on its display, flashing LEDs from its physical body, etc.) and then requests for the user to input (e.g. via the access device) one or more characteristics of the action(s) it takes. If the user is able to respond correctly to the query/request from the new network device, the new network device may determine that it should join the network because the new network device is joining a network that the user (or purchaser) of the new network device is aware of and participating in. Alternatively, the new network device may choose not to join the network if it doesn't receive any response to its request or receives an incorrect request. In other words, the new network device may try to prove possession of the new network device by the user that actually purchased or otherwise owned/controlled the new network device.

The transmission and reception of network snapshots may be accomplished using a beacon session. Although beacon packets may otherwise be used to transmit device information to other network devices, for example to announce their presence or share other identification information, beacon packets may contain space available for the network devices to transmit alternative types of information. Furthermore, since beacon packets may be sent via a WiFi connection on a periodic basis anyway, such beacon packets may transmit such extra information (e.g. network snapshot information for determining authentication of the network) for "free" as the information being transmitted would not take up any additional bandwidth across the WiFi network.

Figure 13:
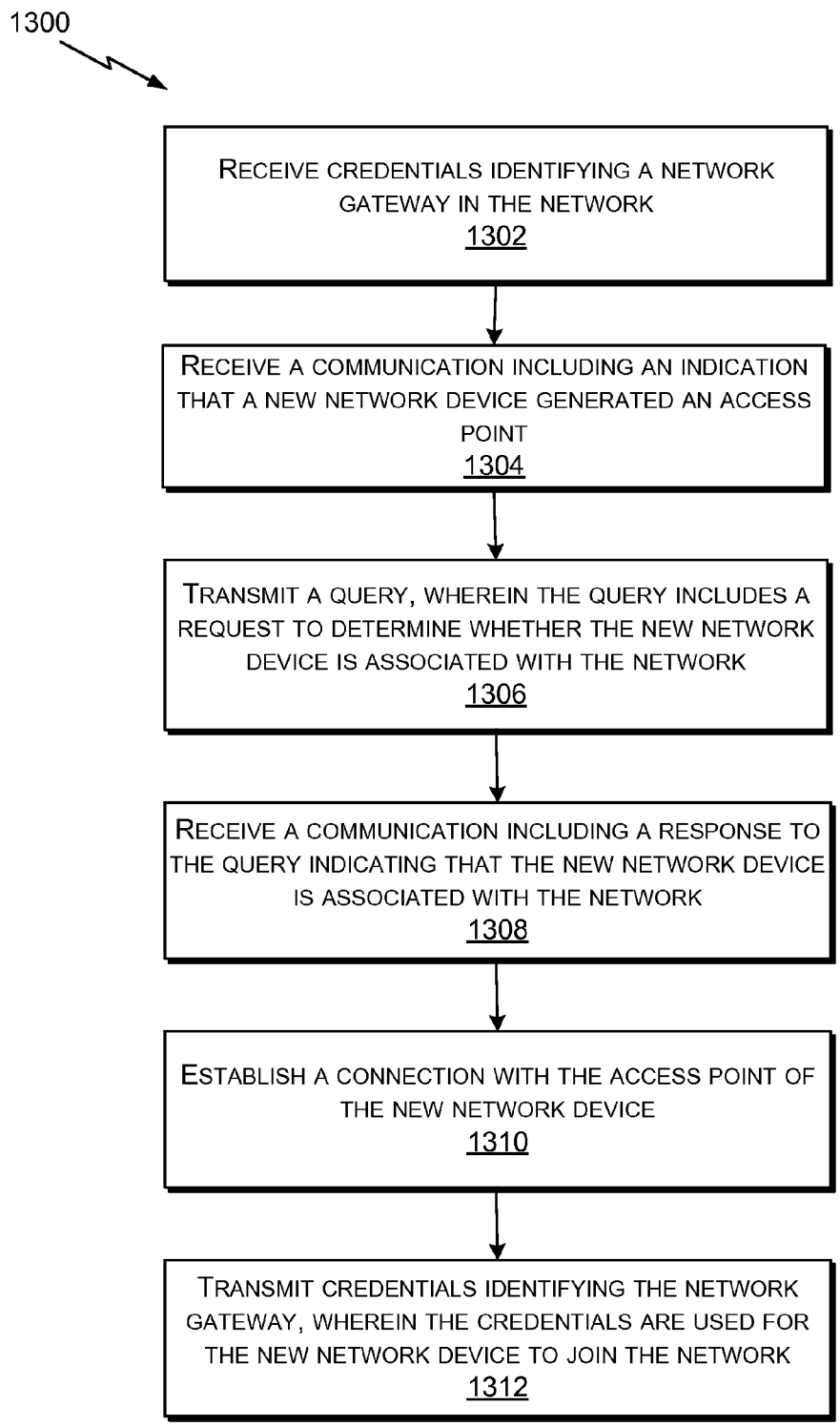
FIG. 13 is a flow chart showing an exemplary process for a network device that recognizes a new network device in range of a local area network in accordance with embodiments of the present invention.

FIG. 13 shows a flow chart showing an exemplary process 1300 for a network device that recognizes a new network device in range of a local area network, such as local area networks 300-700, according to embodiments of the present invention. In step 1302, a network device receives credentials identifying a network gateway in the network. The network device may receive such credentials during/after it has paired with the network gateway and has itself been authorized to communicate with and join the network. As such, since the network device has obtained such network credentials, it may assist any new network device in joining the network (after being approved by the network or a user connected to the network).

Step 1304 includes receiving a communication including an indication that a new network device generated an access point. A network device (e.g. a "first network device"), which has already paired with and been authorized to join a local area network, may receive identification information broadcasted by a new network device after the new network device is turned on, reset, or otherwise powered up. For example, the new network device may generate a setup access point, which may transmit one or more communications (e.g. beacons or beacon frames) or other transmission protocols containing various information, including identification information of the device, identification information of the network, a timestamp, information indicating network bandwidth/latency or other capability information, among other information. Furthermore, beacon frames may be transmitted periodically to announce the presence of network device.

Step 1306 includes transmitting a query, wherein the query includes a request to determine whether the new network device is associated with the network. For example, after the first network device has received a communication including an indication that a new network device generated an access point including information about the new network device, the first network device may transmit a query to an access device to query a user as to whether the new network device should be allowed to join the local area network, or in other words whether the new network device should be authorized. If the user indicates that the new network device should be allowed to join the network, the first network device may receive a communication from the user (via the access device) including a response to the query indicating that the new network device is associated with the network, as shown in step 1308.

After the first network device receives a communication from the user (via the access device) including a response to the query indicating that the new network device is associated with the network, the first network device may establish a connection with the access point of the new network device, as shown in step 1310. Then, in step 1312, after the first network device establishes a connection with the access point of the new network device, the first network device may transmit credentials identifying the network gateway, wherein the credentials are used for the new network device to join the network. The credentials received by the new network device allows the new network device to join the local area network. However, unlike as described with respect to the first network device (e.g. the process described with respect to FIG. 3), the joining of the local area network by the first network device and its corresponding authorization process, the new network device may use credentials shared by a network device previously associated with the local area network instead of from the network itself (e.g. a network gateway). Once the new network device receives the credentials to join the network from the existing network device, the new network device may request that the existing network device or the network provide additional authentication information to ensure that it is joining the intended network (network owned or controlled by the owner or controller of the new network device) instead of a nearby neighbor's network or another undesirable network. Such methods of bilateral authentication are discussed further with respect to FIGS. 11-12.

Figure 14:
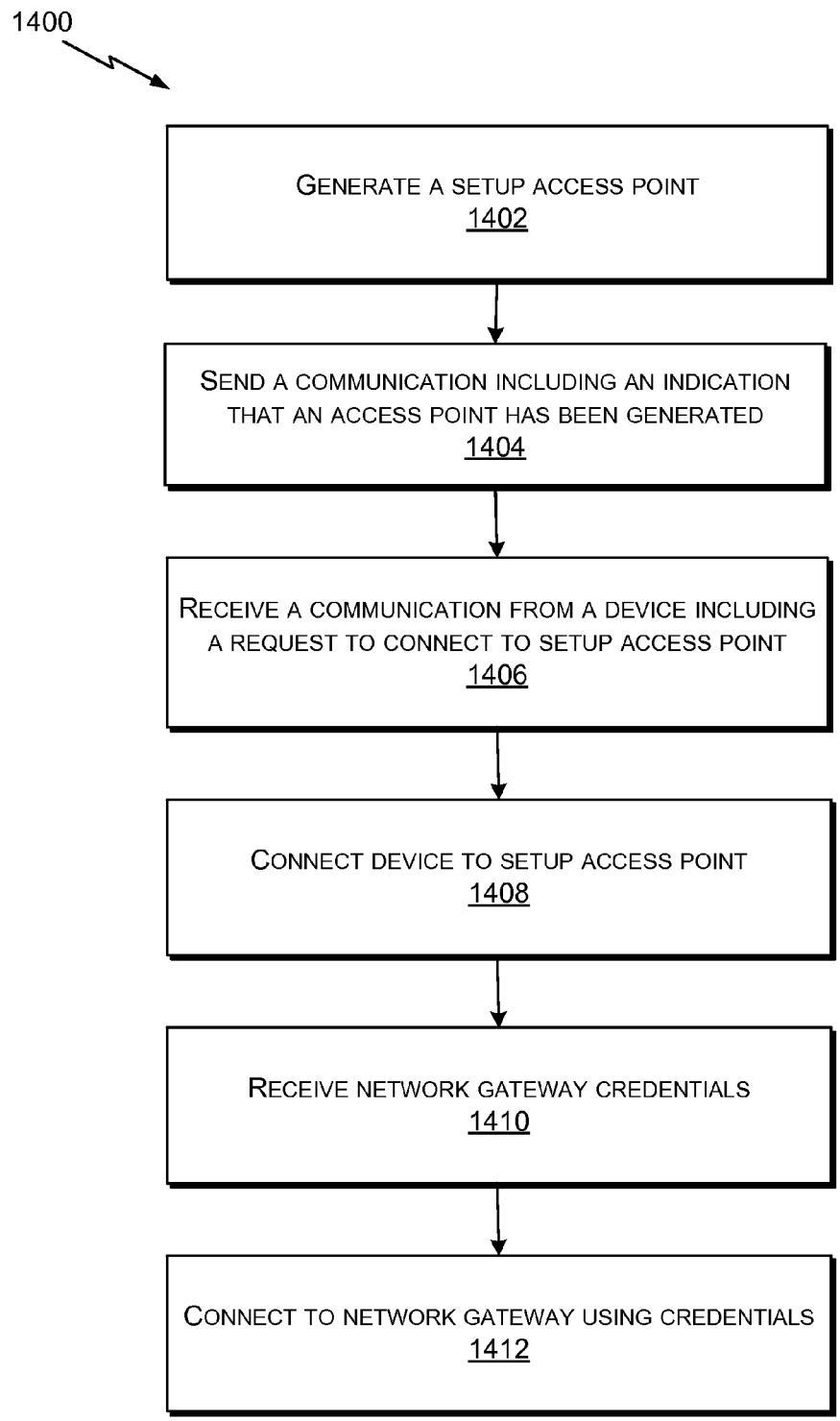
FIG. 14 is a flow chart showing an exemplary process for a network device that recognizes a new network device in range of a local area network in accordance with embodiments of the present invention.

FIG. 14 shows a flow chart showing an exemplary process 1400 for a network device that recognizes a new network device in range of a local area network, such as local area networks 300-700, according to embodiments of the present invention. However, while exemplary process 1300 is an exemplary process described from the perspective of a first (e.g. previously authorized) network device, exemplary process 1400 is an exemplary process described from the perspective of a new network device attempting to join the local area network.

Step 1402 includes generating a setup access point. For example, the new network device may generate a setup access point, which allows wireless devices, such as the new network device, to connect to a network using WiFi or other standards. The setup access point may transmit one or more communications (e.g. beacons or beacon frames) or other transmission protocols containing various information and/or an indication that the new network device is present (e.g. within range of the local area network), as shown in step 1404. More generally, step 1404 may include sending a communication, by the new network device, a communication including an indication that the access point has been generated (and/or, for example, that the new network device is present and/or in range of the local area network).

In step 1406, the new network device receives a communication from a device, such as a network device already a part of the local area network (e.g. a "first network device", as referenced above), including a request to connect to the new network device's setup access point. The setup access point may be, for example, the setup access point generated in step 1402. Step 1406 may take place after, for example, the first network device transmits a query including a request to determine whether the new network device is associated with the network, and the first network device receives a communication including a response to the query indicating that the new network device is associated with the network (for example, as in steps 1306 and 1308, respectively, of process 1300 in FIG. 13). The response to the query may be sent by, for example, an access device after the access device presents a query to a user of the access device (as shown, for example, in display 900 of FIG. 9) asking the user whether the new network device should be allowed to join the network (or, in other words, is "associated with" the network).

In step 1408, the first network device may allow the first network device to connect to the new network device. The first network device may, in turn, allow the new network device to connect to the first network device and other devices on the local area network. Furthermore, a connection between the first network device and the setup access point of the new network device may allow the first network device to send data, including network credentials, to the new network device. Step 1410 includes receiving network gateway credentials. The new network device may receive network credentials from the first network device, as noted, or any other device on the network. For example, the new network device may receive network credentials from an access device connected to the local area network.

In step 1410, the new network device may use the network credentials received from the first network device to join the network. For example, the new network device may use the network credentials to identify a network gateway within the local area network and connect directly to the network gateway. The new network device may also connect to any other device on the network. Once the new network device receives the credentials to join the network from the existing network device, the new network device may request that the existing network device or the network provide additional authentication information to ensure that it is joining the intended network (network owned or controlled by the owner or controller of the new network device) instead of a nearby neighbor's network or another undesirable network. Such methods of bilateral authentication are discussed further with respect to FIGS. 11-12.

Figure 15:
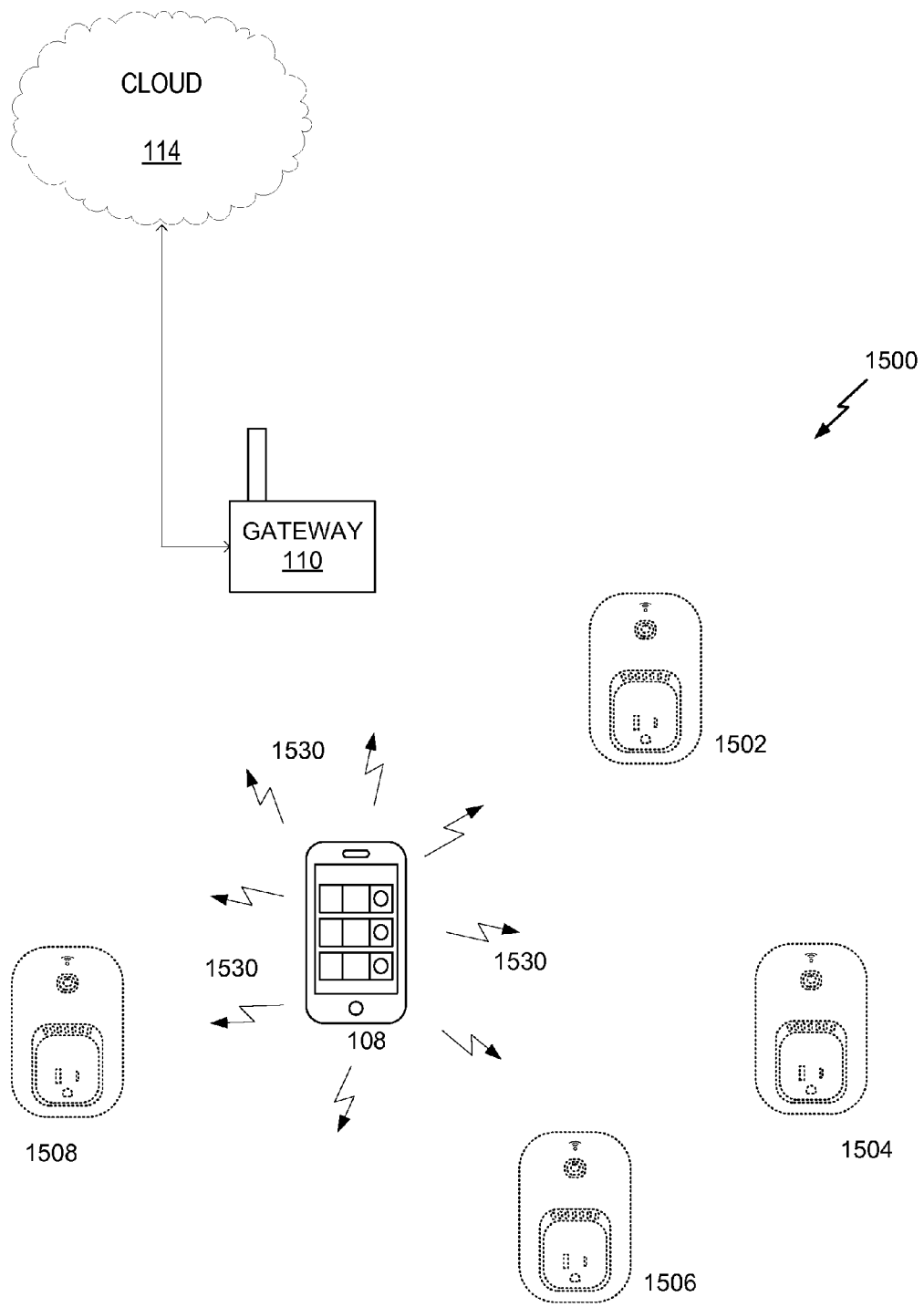
FIG. 15 is an example of a network environment, according to embodiments of the present invention.

FIG. 15 illustrates an example of a network 1500, according to embodiments of the present invention. Specifically, the network 1500 can be a wireless local area network enabling an access device to communicate with network devices to control adjustment of attributes related to operation of the network devices. Network 1500 includes network device 1502, network device 1504, network device 1506, and network device 1508. The network 1500 also includes access device 108. In other words, the network 1500 may be substantially similar to the network 100 except that access device 108 has been turned on near the network 1500, to which it is associated, or has entered an area to which the network 1500 can reach.

When access device 108 can enter the network 1500 as shown in FIG. 15, access device 108 may be authenticated based on the access device's authentication with the logical network or may otherwise commence communication with cloud network 114. Access device 108 may also communicate notification of its presence or other information directly to other network devices 1502-1508 within network 1500, as shown in FIG. 15 by communication paths 1530. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1500, including network device 1502, network device 1504, network device 1506, and network device 1508, information/data regarding its status. Such status data may include the fact that it is present and turned on, or other status data/information. At any time that network devices 1502, 1504, 1506 and 1508 recognize that access device 108 is present at network 1500, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1502-1508 and access device 108 may each receive communication from other network devices around the network 1500, including the status of each of those network devices, network devices 1502-1508 and/or access device 108 may be continuously scanning network 1500 (including, for example, running discovery algorithms) to determine whether any devices within the network have moved, turned on/off or otherwise added to or subtracted from the network 1500, or have otherwise changed statuses.

Since network devices 1502-1508 and access device 108 may each receive communication from other devices around network 1500, including the status of each of those devices, each network device within network 1500 may know the status of each other network device in the network 1500. For example, access device 108 or devices 1502-1508 may not be required to communicate with cloud network 114 in order to obtain one or more of such statuses. Since cloud network 114 is an external network and may be remote from network 1500, communication between network devices within the network 1500 and cloud 114 may take more time than communication between two devices within network 1500. For example, communication between devices within network 1500 may take anywhere from 1 millisecond to 100 milliseconds, while communication between a device within network 1500 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1500 may choose to send and receive/retrieve statuses directly with other devices within the network 1500 instead of communicating such information via cloud network 114. When a network device receives status data from another network device on the device's local area network 1500, it may store that status data so that it may retrieve and use that status data at a later time.

Figure 16:
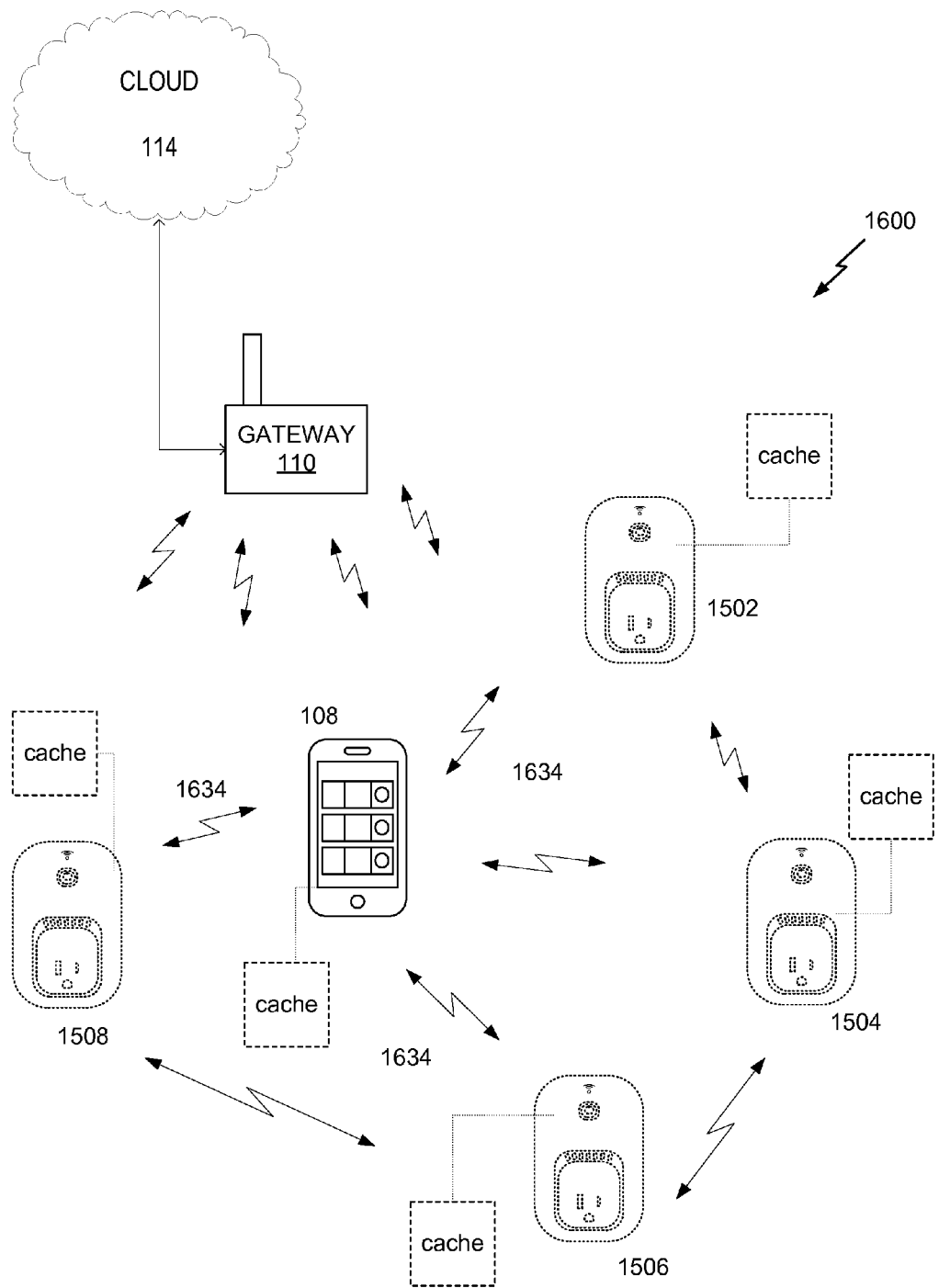
FIG. 16 is an example of a network environment, according to embodiments of the present invention.

FIG. 16 illustrates an example of a network 1600, according to embodiments of the present invention. The local area network 1600 may include network device 1502, network device 1504, network device 1506, network device 1508, and access device 108. FIG. 16 also illustrates that one or more network devices 1502-1508 and/or access device 108 may include a storage device, such as a cache, for storing data, including data regarding its own status and data regarding statuses received from the other devices within local area network 1600. For example, access device 108 may, after being powered up, broadcast/send its status to network device 1508 via communication 1634. Network device 1508 may store the status data received from access device 108 until the next time access device 108 updates its status by sending new/updated status data to network device 1508. Cache may be used for storage within network devices 1502-1508 and/or access devices within the local area network 1600 so that each of the devices may be able to quickly retrieve the data it needs from storage. An application operating on the access device 108 can access the cache to obtain information to display the visual interface for each network device 1502-1508 registered within the network 1600. Although a caching device may be used to store such data within the network and/or access devices within the local area network 1600, other types of storage may be used.

The cache can contain a known interface list including interface information for different, known types of devices. The known list can include a record for each network device known by the access device 108 to exist on the network 1600. When an application is run on the access device 108, the access device 108 can access the known interfaces in the cache to present the display of access device 108. The display can present one or more visual interfaces, each corresponding to a network device known to exist on the network 1600. Each visual interface can be generated based on a visual interface module corresponding to each device on the network 1600. In an example, the display can include a visual interface (e.g., a module tile) for each device in the network 1600 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1600. For example, the status display can include a speed of a fan (e.g., a fan speed of 56 in a range of values between 0 and 100) of the network device 1502 (e.g., a fan), a value of sensitivity of a sensor (e.g., a value of 34 in a range of values 0-100) for the network device 1504 (e.g., a motion sensor), a value of brightness (e.g., 65 percent brightness) for the network device 1506 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1600 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1600, a network device may not know when another network device changes status (e.g. turns/powers off) . However, network devices and/or access devices within local area network 1600 may broadcast/send any updates in its status to other devices on the network. For example, if network device 1502 changes status, it may send status data to the other network devices, such as network devices 1504, 1506 and 1508 and to access device 108. However, network device 1502 may not know which devices to update since the other devices may change statuses periodically (e.g. turn off).

Therefore, a network or access device may subscribe to another network or access device within local area network 1600. For example, network devices 1504, 1506 and 1508 and access device 108 may subscribe to status data notifications/updates from network device 1502. Such a subscription may be registered for upon initial connection with network device 1502 when network device 1502 first enters local area network 1600 or at any other time after network device 1502 has been associated with local area network 1600. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1502 may store a list of network devices 1504, 1506 and 1508 and access device 108 after those devices subscribe to network device 1502. Then, when network device 1502 undergoes a change in status, network device 1502 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1600, each contain continuously updated statuses of each other device on the network and obtain those statuses and updates through direct communication without necessary use of the cloud.

Figure 17:
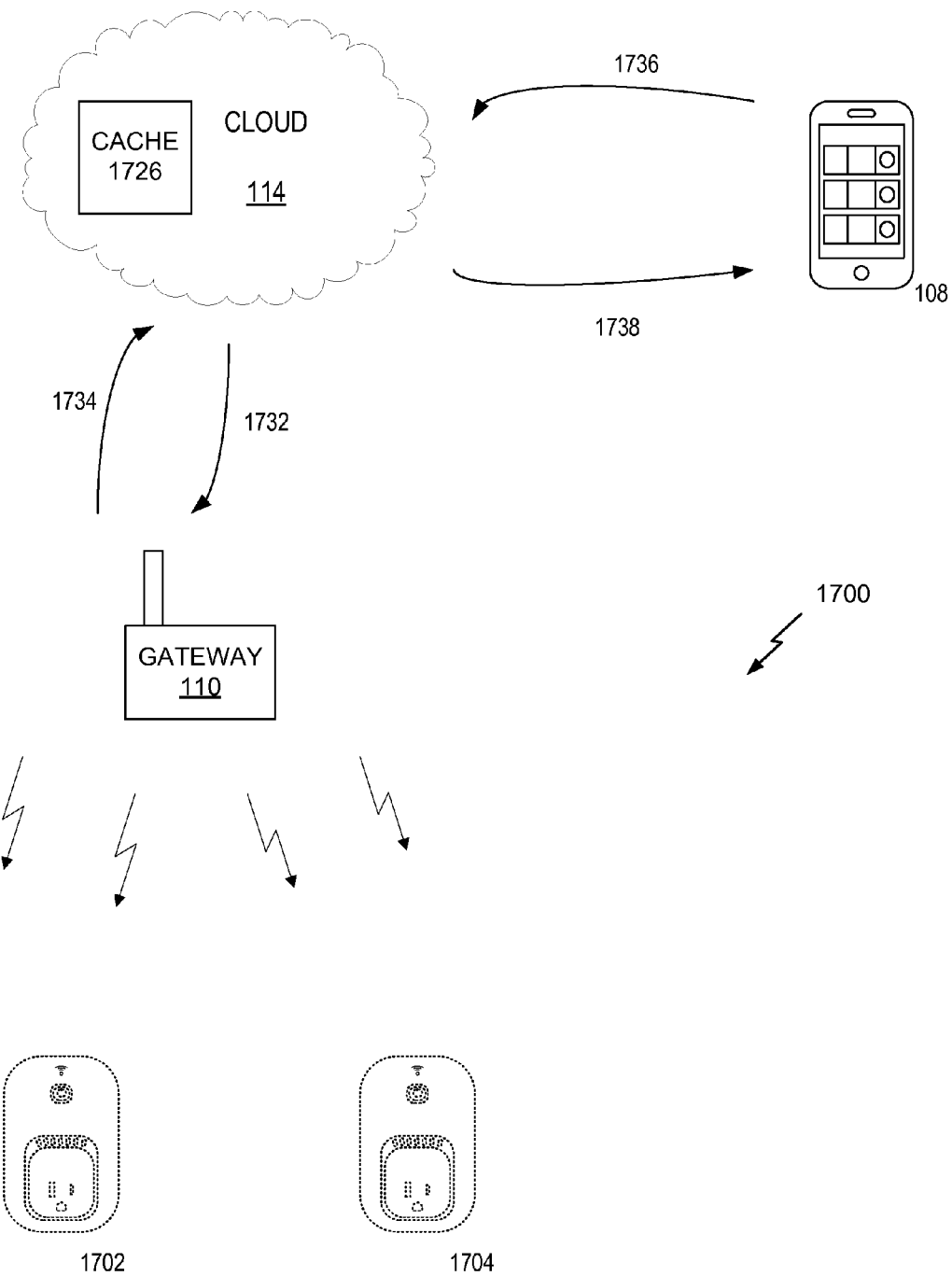
FIG. 17 is an example of a network environment, according to embodiments of the present invention.

FIG. 17 illustrates an access device 108 that is located remotely from network 1700 (e.g. local area network), according to embodiments of the present invention. Local area network 1700 includes gateway 110 and network devices 1702 and 1704 (which may be, for example, the same as any of network devices 1502-1508 in FIGS. 15 and 16), as shown in FIG. 17. However, network 1700 may also include a variety of other network devices and one or more access devices directly connected to network 1700. Gateway 110 is connected to cloud network 114, and allows network devices 1702 and 1704 to connect to cloud 114, the internet, or other external networks via gateway 110. In some embodiments, the network devices 1702 and 1704 may include home automation devices that allow a user to access, control, and/or configure various home appliances located within the user's home, such as a television, radio, light, microwave, iron, and/or the like.

Access device 108 is not directly connected to network 1700. Instead, access device 108 is external to network 1700 and may connect to cloud network 114 and to network 1700 via cloud network 114. As noted, network devices 1702 and 1704 may change status on a periodic basis. In some embodiments, even when external to and not directly connected to network 1700, an access device may request to check the status of the devices on the network. When access device 108 seeks to check the status of any device on the network, the access device 108 may transmit/send a communication 1736 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1738 of such status data to the access device 108. For example, after network devices 1702 and 1704 are turned on, authenticated and are a part of network 1700, network devices 1702 and 1704 may communicate their statuses to cloud network 114. Furthermore, any time the status of network devices 1702 and 1704 changes, the device that incurred a status change may push/send information (e.g. an indication) of that status change to cloud network 114. Cloud network 114 may store, in cache 1726 or otherwise, the statuses (which may be time stamped in metadata or otherwise) of network devices 1702 and 1704. Therefore, when access device 108 requests from cloud network 114 the statuses of devices on network 1700, cloud 114 may send its most recently stored/updated statuses to access device 108.

To obtain the most updated status data of devices within network 1700, cloud 114 may, upon receiving a request for status data related to network devices 1702 and 1704, transmit/send a communication 1732 (e.g. request, query, etc.) for such status data to network devices 1702 and 1704 via gateway 110. Once network devices 1702 and 1704 receive this request, network devices 1702 and 1704 may send a communication 1734 (e.g. updated status data) to cloud 114 to replace the previously stored/cached statuses in cache 1726. Upon receipt of updated status data 1734 from network 1700, cloud 114 may send a communication 1738 of such status data to the access device 108.

However, the process of cloud network 114 requesting updated statuses from network devices 1702 and 1704 within network 1700 may cause latency within the system. More specifically, the time required for cloud network 114 to request updated statuses from network devices 1702 and 1704 and to in turn receive updated statuses from network devices 1702 and 1704 may be substantially greater than the time required for cloud network 114 to send its currently stored statuses (without being updated) for network devices 1702 and 1704 to access device 108. For example, of the total time required for access device 108 to receive updated statuses from cloud network 114, 80% or more of that total time may include cloud network 114 requesting updated statuses from network devices 1702 and 1704. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1702 and 1704 is the transmission of data between cloud 114 and network devices 1702 and 1704, the access device 108 and cloud network 114 may maximize efficiency by minimizing the effect of the transmission of data between cloud 114 and network devices 1702 and 1704 on the whole process/system.

Figure 18:
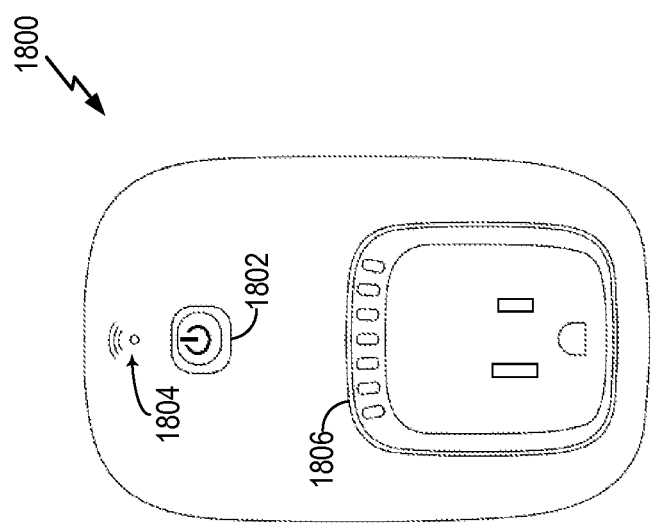
FIG. 18 is an illustration of an example of a front view of a network device in accordance with an embodiment of the present invention.
Figure 19:
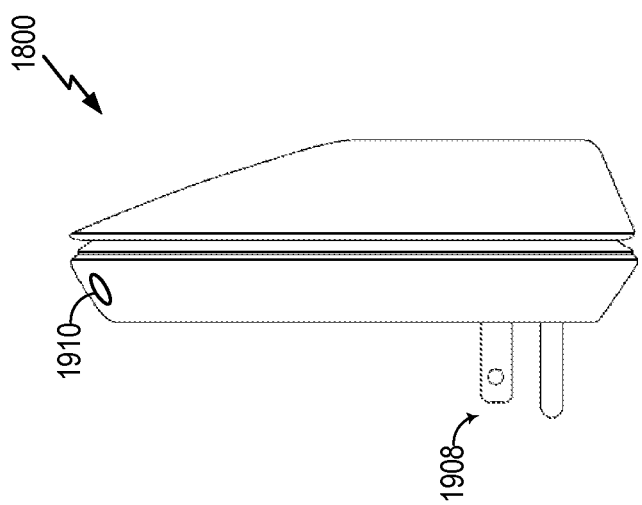
FIG. 19 is an illustration of an example of a side view of a network device in accordance with an embodiment.

FIG. 18 illustrates an example of a front view of a network device 1800. FIG. 19 illustrates an example of a side view of the network device 1800. The network device 1800 may include any of the network devices 102, 104, or 106 described herein. In some embodiments, the network device 1800 may be a home automation network device. For example, the network device 1800 may include a home automation switch that may be coupled with a home appliance. A user may wirelessly access the network device 1800 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1800 may include a WiFi enabled switch that connects home appliances and other electronic devices to a compatible 802.11b/g/n/ac WiFi network. The network device 1800 may thus allow users to locally or remotely turn devices on or off from anywhere, program customized notifications, and/or change device status. The network device 1800 may further allow a user to create custom schedules or have devices respond to sunrise or sunset.

The network device 1800 includes an power switch 1802 that may be depressed in order to turn the network device 1800 on and off. In some embodiments, a light source may be integrated with or located behind the power switch. For example, a light-emitting diode (LED) may be located on a circuit board under the power button 1802. The light source may be illuminated when the network device 1800 is powered on, and may not be illuminated when the network device 1800 is powered off.

The network device 1800 further includes a communications signal indicator 1804. The signal indicator 1804 may indicate whether the network device 1800 has access to a communications signal, such as a WiFi signal. For example, the signal indicator 1804 may include a light source (e.g., a LED) that illuminates when the network device 1800 is connected to a communications signal. The light source may depict different colors or other characteristics (e.g., flashing, dimming, or the like) to indicate different levels of signal strength or mode of operation.

The network device 1800 includes a restore button 1910. The restore button 1910 may allow a user to reset the network device 1800 to factory default settings. For example, upon being depressed, the restore button 1910 may cause all software on the device to be reset to the settings that the network device 1800 included when purchased from the manufacturer.

The network device 1800 further includes a plug 1908 and an outlet 1806. The plug 1908 allows the network device 1800 to be plugged into a wall socket, such as a socket providing 120V, 220V, or the like. In turn, an appliance may be plugged into the outlet 1806. Once the network device 1800 is registered according to the techniques described above, an appliance plugged into the socket 1806 may be controlled by a user using an access device (e.g., access device 108).

Figure 20:
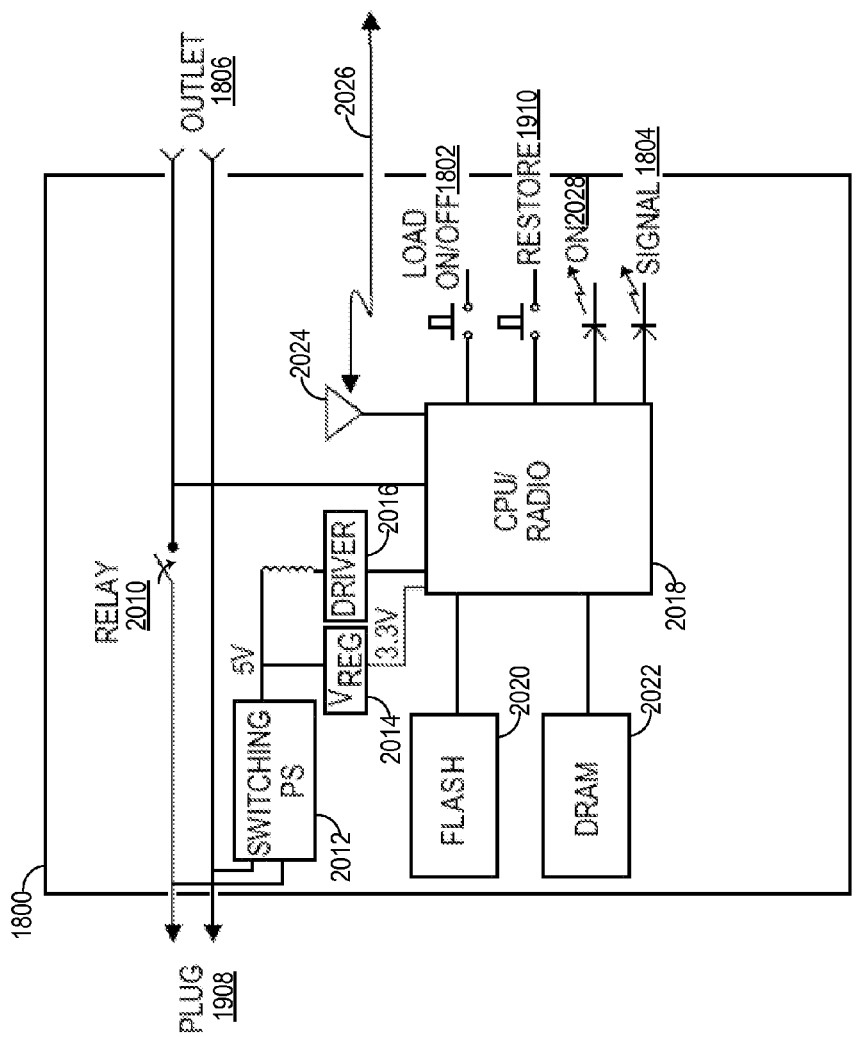
FIG. 20 is an example of a block diagram of a network device, in accordance with an embodiment.

FIG. 20 is an example of a block diagram of the network device 1800 depicting different hardware and/or software components of the network device 1800. As described above with respect to FIGS. 18 and 19, the network device 1800 includes the outlet 1806, the plug 1908, the power button 1802, the restore button 1910, and the communications signal indicator 1804. The network device 1800 also includes light source 2028 associated with the power button 1802. As previously described, the light source 2028 may be illuminated when the network device 1800 is powered on.

The network device 1800 further includes a relay 2010. The relay 2010 is a switch that controls whether power is relayed from the plug 1908 to the outlet 1806. The relay 2010 may be controlled either manually using the power button 1802 or remotely using wireless communication signals. For example, when the power button 1802 is in an ON position, the relay 2010 may be closed so that power is relayed from the plug 1908 to the outlet 1806. When the power button 1802 is in an OFF position, the relay 2010 may be opened so that current is unable to flow from the plug 1908 to the outlet 1806. As another example, an application or program running on an access device may transmit a signal that causes the relay 2010 to be opened or closed. For instance, an access application may display a graphical interface on the access device that includes a power button. The user may tap or otherwise select the power button, and the access application may send a communication signal (e.g., over a WiFi network) to the network device 1800 instructing the network device 1800 to open or close the relay 2010.

The network device 1800 further includes flash memory 2020 and dynamic random access memory (DRAM) 2022. The flash memory 2020 may be used to store instructions or code relating to an operating system, one or more applications, and any firmware. The flash memory 2020 may include nonvolatile memory so that any firmware or other program can be can updated. In the event the network device 1800 loses power, information stored in the flash memory 2020 may be retained. The DRAM 2022 may store various other types of information needed to run the network device 1800, such as all runtime instructions or code.

The network device 1800 further includes a CPU/Radio 2018. The CPU/Radio 2018 controls the operations of the network device 1800. For example, the CPU/Radio 2018 may execute various applications or programs stored in the flash memory 2020 and/or the dynamic random access memory (DRAM) 2022. The CPU/Radio 2018 may also receive input from the various hardware and software components, interpret the input, and perform one or more functions in response to the input. As one example, the CPU/Radio 2018 may determine whether the power button 1802 has been pressed, and determines whether the relay 2010 needs to be opened or closed. The CPU/Radio 2018 may further perform all communications functions in order to allow the network device 1800 to communicate with other network devices, one or more gateways, a cloud network, and/or one or more access devices. While the CPU and radio of the network device 1800 are shown to be combined in the CPU/Radio 2018, one of ordinary skill in the art will appreciate that, in some embodiments, the CPU and radio may be separately located within the network device 1800. For example, CPU circuitry may be situated at a separate location on a circuit board from the location of radio circuitry, the CPU circuitry may be located on a different circuit board from the radio circuitry, or the like.

The network device 1800 may communicate with other devices and/or networks via antenna 2024. For example, antenna 2024 may include a 2.4 GHz antenna, a 5 GHz antenna, or the like, that can transmit and receive WiFi communications signals. The antenna 2024 may include other types of antennas that can communicate Bluetooth® signals, Zigbee® signals, Ultra-Wideband (UWB) signals, and/or the like. In some embodiments, the network device 1800 may include multiple antennas for communicating different types of communication signals. As one example, the network device 1800 may include both a 2.4 GHz antenna and a 5 GHz antenna.

The network device 1800 further includes a driver 2016, a switching power supply 2012, and a voltage regulator 2014. The driver 2016 may include instructions or code that can be used to translate control signals or commands received from applications running on the DRAM 2022 to commands that the various hardware components in the network device 1800 can understand. In some embodiments, the driver 2016 may include an ambient application running on the DRAM 2022. The switching power supply 2012 may be used to transfer power from the outlet in which the plug 1908 is connected to the various loads of the network device 1800 (e.g., CPU/Radio 2018). The switching power supply 2012 may efficiently convert the voltage and current characteristics of the electrical power to a level that is appropriate for the components of the network device 1800. For example, the switching power supply 2012 may perform AC-DC conversion. In some embodiments, the switching power supply 2012 may be used to control the power that is relayed from the plug 1908 to the outlet 1806. The voltage regulator 2014 may be used to convert the voltage output from the switching power supply 2012 to a lower voltage usable by the CPU/Radio 2018. For example, the voltage regulator 2014 may regulate the DC voltage from 5V to 3.3V.

In various embodiments, functions may be stored as one or more computer-program products, such as instructions or code, in a non-transitory machine-readable storage medium, such as the flash memory 2020 and/or the DRAM 2022. The network device 1800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 2020 and/or the DRAM 2022, may be a processor-readable memory and/or a computer-readable memory that stores software code (programming code, instructions, etc.) configured to cause a processor(s) within the CPU/Radio 2018 to perform the functions described. In other embodiments, one or more of the functions described may be performed in hardware.

A set of these instructions and/or code might be stored on a non-transitory machine-readable storage medium, such as the flash memory 2020 and/or the DRAM 2022. In some cases, the storage medium might be incorporated within a computer system, such as the CPU/Radio 2018. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1800 and/or might take the form of source and/or installable code, which, upon compilation and/or installation on the network device 1800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1800 may have other components than those depicted in FIGS. 18-20. Further, the embodiment shown in the figures are only one example of a network device that may incorporate an embodiment of the invention. In some other embodiments, network device 1800 may have more or fewer components than shown in the figure, may combine two or more components, or may have a different configuration or arrangement of components.

Figure 21:
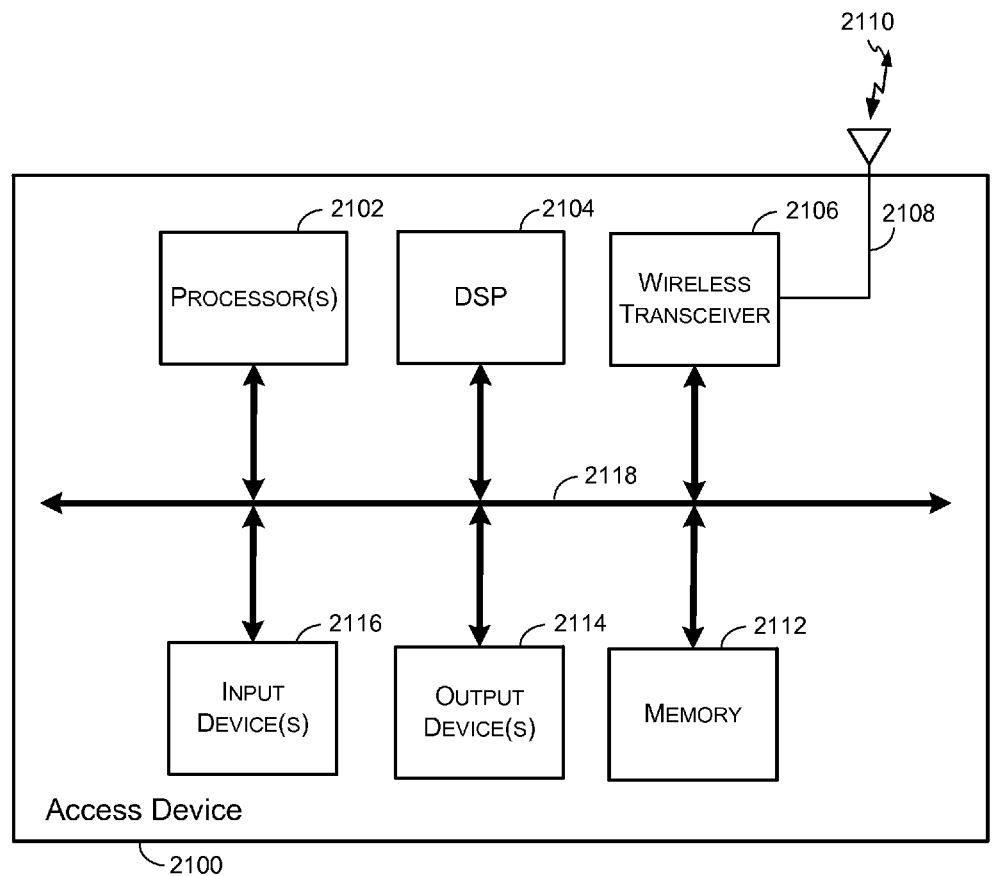
FIG. 21 is a block diagram illustrating an example of an access device, in accordance with some embodiments.

FIG. 21 illustrates an example of an access device 2100. The access device 2100 may include any human-to-machine interface with network connection capability that allows access to a network. For example, the access device 2100 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 2100 includes hardware elements that can be electrically coupled via a bus 2118 (or may otherwise be in communication, as appropriate). In one embodiment, the bus 2118 can be used for the processor(s) 2102 to communicate between cores and/or with the memory 2112. The hardware elements may include one or more processors 2102, including without limitation one or more general-purpose processors and/or one or more special-purpose processors (such as digital signal processing chips, graphics acceleration processors, and/or the like); one or more input devices 2116, which can include without limitation a camera, a mouse, a keyboard, a touch sensitive screen, a touch pad, a keypad, and/or the like; and one or more output devices 2114, which can include, without limitation, a display, a printer, and/or the like.

The access device 2100 may include one or more wireless transceivers 2106 connected to the bus 2118. The wireless transceiver 2106 may be operable to receive wireless signals (e.g., signal 2110) via antenna 2108. The wireless signal 2110 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 2106 may be configured to receive various radio frequency (RF) signals (e.g., signal 2110) via antenna 2108 from one or more gateways, network devices, other access devices, cloud networks, and/or the like. Access device 2100 may also be configured to decode and/or decrypt, via the DSP 2104 and/or processor(s) 2102, various signals received from one or more gateways, network devices, other access devices, cloud networks, and/or the like.

The access device 2100 may further include (and/or be in communication with) one or more non-transitory machine-readable storage mediums or storage devices (e.g., memory 2112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2112, such as RAM, ROM, FLASH, or disc drive, and executed by processor(s) 2102 or DSP 2104. The access device 2100 can also comprise software elements (e.g., located within the memory 2112), including, for example, an operating system, device drivers, executable libraries, and/or other code, such as one or more application programs, which may comprise computer programs implementing various functions. Memory 2112 may be a non-transitory machine-readable storage medium, processor-readable memory, and/or a computer-readable memory that stores the one or more computer-program products configured to cause the processor(s) 2102 and/or DSP 2104 to perform the various functions. In other embodiments, the various functions described may be performed in hardware.

Figure 22:
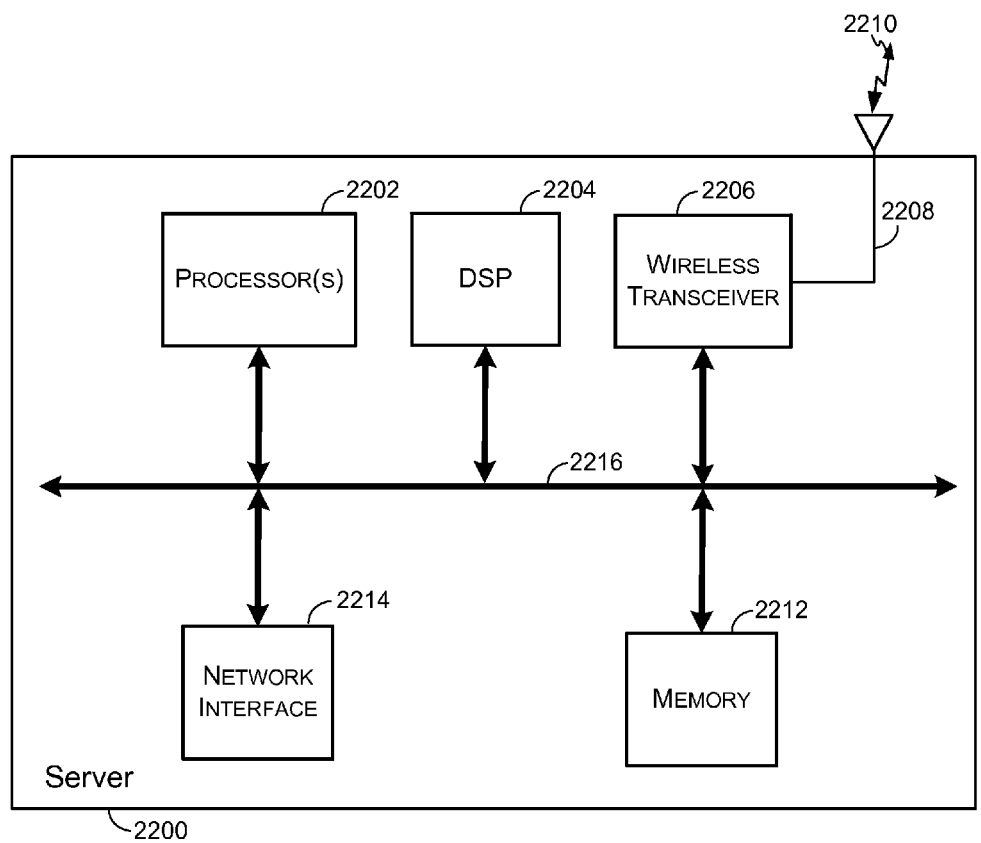
FIG. 22 is a block diagram illustrating an example of a server, in accordance with some embodiments.

FIG. 22 illustrates an example of a server 2200. The server 2200 includes hardware elements that can be electrically coupled via a bus 2216 (or may otherwise be in communication, as appropriate). In one embodiment, the bus 2216 can be used for the processor(s) 2202 to communicate between cores and/or with the memory 2212. The hardware elements may include one or more processors 2202, including without limitation one or more general-purpose processors and/or one or more special-purpose processors (such as digital signal processing chips, graphics acceleration processors, and/or the like), memory 2212, DSP 2204, a wireless transceiver 2206, a bus 2216, and antenna 2208. Furthermore, in addition to the wireless transceiver 2206, server 2200 can further include a network interface 2214 to communicate with a network (e.g., a local area network, a network of a preferred carrier, Internet, etc.).

The server 2200 may further include (and/or be in communication with) one or more non-transitory machine-readable storage mediums or storage devices (e.g., memory 2212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2212. The server 2200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 2212 may be a non-transitory machine-readable storage medium, processor-readable memory, and/or a computer-readable memory that stores the one or more computer-program products configured to cause the processor(s) 2202 to perform the functions described. In other embodiments, one or more of the functions described may be performed in hardware.

A set of these instructions and/or code might be stored on a non-transitory machine-readable storage medium, such as the memory 2212. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 2200 and/or might take the form of source and/or installable code, which, upon compilation and/or installation on the server 2600 (e.g., using any of a variety of generally available compilers, installation programs, compression/decompression utilities, etc.) then takes the form of executable code.

Figure 23:
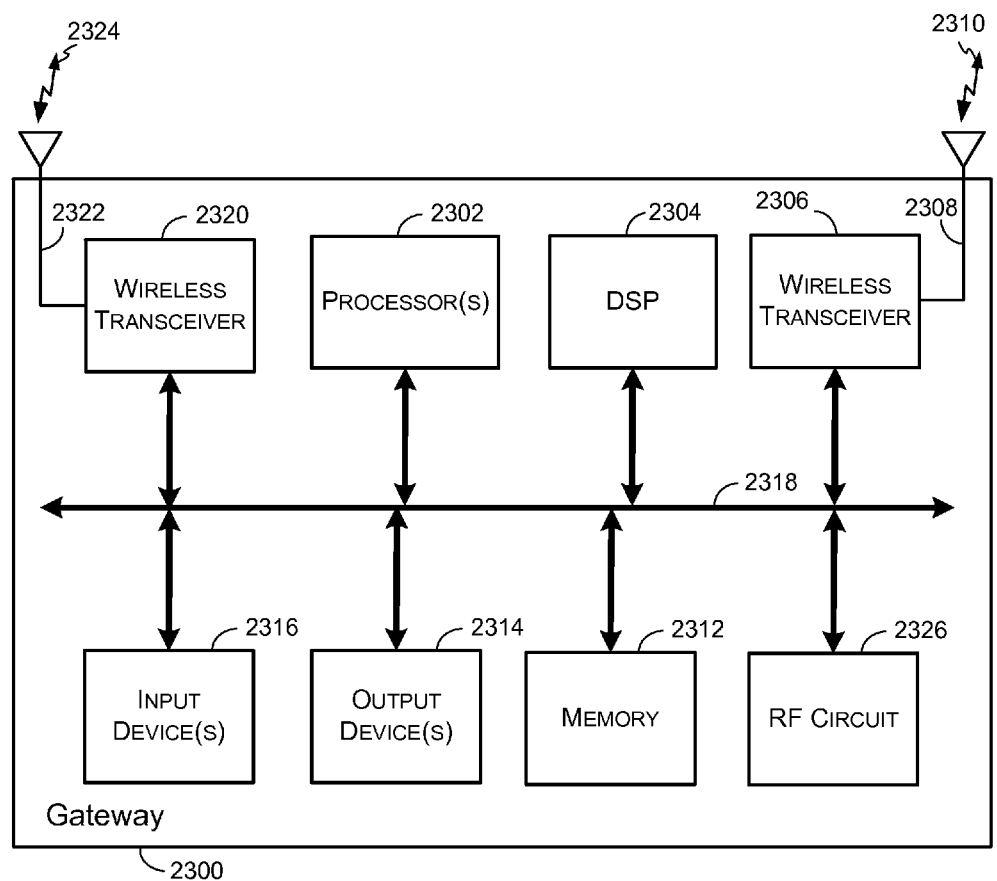
FIG. 23 is a block diagram illustrating an example of a gateway, in accordance with some embodiments.

FIG. 23 illustrates an example of a gateway 2300. The gateway 2300 may include a range extending device, a router, an access point, a modem, and/or any other device that provides network access among one or more computing devices and/or external networks. For example, the gateway 2300 may include a router gateway with access point and router functionality, and may further include an Ethernet switch and/or a modem. As another example, the gateway 2300 may include a range extending gateway that may be used to improve signal range and strength within a network by taking an existing signal from another gateway (e.g., a router gateway, an access point, or the like) and rebroadcasting the signal to create a second logical network.

The gateway 2300 includes hardware elements that can be electrically coupled via a bus 2318 (or may otherwise be in communication, as appropriate). In one embodiment, the bus 2318 can be used for the processor(s) 2302 to communicate between cores and/or with the memory 2312. The hardware elements may include one or more processors 2302, including without limitation one or more general-purpose processors and/or one or more special-purpose processors (such as digital signal processing chips, graphics acceleration processors, and/or the like); one or more input devices 2316, which can include without limitation one or more buttons, a keyboard, a keypad, a touch sensitive screen, a touch pad, and/or the like; and one or more output devices 2314, which can include, without limitation, a display, light or sound indicators, and/or the like.

The gateway 2300 may include one or more wireless transceivers 2306 and 2320 connected to the bus 2318. The wireless transceiver 2306 may be operable to receive wireless signals (e.g., a wireless signal 2310) via an antenna 2308. The wireless transceivers 2320 may be operable to receive wireless signals (e.g., a wireless signal 2314) via an antenna 2322. The wireless transceivers 2306 and 2320 may each include a WiFi transceiver radio designed to transmit and receive signals using frequencies of a specific frequency band, which may be referred to herein as "WiFi circuits." For example, wireless transceiver 2306 may include a 2.4 GHz WiFi circuit, and wireless transceiver 2320 may include a 5 GHz WiFi circuit. Accordingly, the gateway 2300 may include a single WiFi circuit for a first WiFi frequency band, and a single WiFi circuit for a second WiFi frequency band. In some embodiments, the gateway 2300 may include multiple wireless transceivers (not shown) for each available frequency band. The antennas 2308 and 2322 may include multiple band antennas that can transmit and/or receive signals over different frequency bands.

The gateway 2300 may further include radio frequency (RF) circuit 2326. In some embodiments, the wireless transceivers 2306 and 2320 may be integrated with or coupled to the RF circuit 2326 so that the RF circuit 2326 includes the wireless transceivers 2306 and 2320. In some embodiments, the wireless transceivers 2306 and 2320 and the RF circuit 2326 are separate components. The RF circuit 2326 may include a RF amplifier that may amplify signals received over antennas 2308 and 2322. The RF circuit 2326 may also include a power controller that may be used to adjust signal amplification by the RF amplifier. The power controller may be implemented using hardware, firmware, software, or any combination thereof.

The wireless signals 2310 and 2324 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 2306 and 2320 may be configured to receive various radio frequency (RF) signals (e.g., signals 2310 and 2324) via antennas 2308 and 2324, respectively, from one or more other gateways, access devices, network devices, cloud networks, and/or the like. Gateway 2300 may also be configured to decode and/or decrypt, via the DSP 2304 and/or processor(s) 2302, various signals received from one or more gateways, network devices, cloud networks, and/or the like.

The gateway 2300 may include a power supply (not shown) that can power the various components of the gateway 2300. The power supply may include a switch-mode power supply, a linear power supply, a push-pull power supply, or any other suitable type of power supply. In some embodiments, the gateway 2300 may include multiple power supplies. For example, a switch-mode power supply may be used to condition input power, and a linear power supply may be used to power the RF circuit 2326. The power supply may be configured to operate over various ranges of appropriate input voltages.

The gateway 2300 may further include (and/or be in communication with) one or more non-transitory machine-readable storage mediums or storage devices (e.g., memory 2312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2312, such as RAM, ROM, FLASH, or disc drive, and executed by processor(s) 2302 or DSP 2304. The gateway 2300 can also comprise software elements (e.g., located within the memory 2312), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 14, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 14. The memory 2312 may be a non-transitory machine-readable storage medium, processor-readable memory, and/or a computer-readable memory that stores the one or more computer-program products configured to cause the processor(s) 2302 to perform the functions described. In other embodiments, one or more of the functions described may be performed in hardware.

A set of these instructions and/or code might be stored on a non-transitory machine-readable storage medium, such as the memory 2312. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2300 and/or might take the form of source and/or installable code, which, upon compilation and/or installation on the gateway 2300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a new network device, credentials identifying an existing network device in a network;
   transmitting a query, wherein the query includes a request to identify identification information associated with the new network device;
   receiving a response to the query;
   determining that the response to the query includes accurate identification information associated with the new network device; and
   establishing a connection with the existing network device on the network using the received credentials.

2. The method of claim 1, further comprising:
   generating a setup access point;
   receiving a request for an existing network device to connect to the setup access point; and
   establishing a connection with the existing network device.

3. The method of claim 1, wherein the query is an authentication query configured to confirm an identification of a recipient of the query.

4. The method of claim 1, further comprising:
   transmitting a communication including an indication that the new network device will, based on the received response to the query, join the network.

5. The method of claim 1, further comprising:
   transmitting a communication including an indication that the new network device will not, based on the received response to the query, join the network.

6. The method of claim 1, wherein determining that the response to the query includes accurate identification information includes comparing the received response to the query with stored identification information.

7. The method of claim 1, wherein when the query is received, the query is displayable on an access device connected to the network.

8. The method of claim 1, further comprising:
   transmitting a setup beacon including information identifying the new network device.

9. A computing device, comprising:
   one or more processors; and
   a memory having instructions stored thereon, which when executed by the one or more processors, cause the computing device to perform operations including:
   receiving, at a new network device, credentials identifying an existing network device in a network;
   transmitting a query, wherein the query includes a request to identify identification information associated with the new network device;
   receiving a response to the query;
   determining that the response to the query includes accurate identification information associated with the new network device; and
   establishing a connection with the existing network device on the network using the received credentials.

10. The computing device of claim 9, further comprising instructions, which when executed by the one or more processors, cause the computing device to perform operations including:
    generating a setup access point;
    receiving a request for an existing network device to connect to the setup access point; and
    establishing a connection with the existing network device.

11. The computing device of claim 9, wherein the query is an authentication query configured to confirm an identification of a recipient of the query.

12. The computing device of claim 9, further comprising instructions, which when executed by the one or more processors, cause the computing device to perform operations including:
    transmitting a communication including an indication that the new network device will, based on the received response to the query, join the network.

13. The computing device of claim 9, further comprising instructions, which when executed by the one or more processors, cause the computing device to perform operations including:

transmitting a communication including an indication that the new network device will not, based on the received response to the query, join the network.

14. The computing device of claim 9, wherein determining that the response to the query includes accurate identification information includes comparing the received response to the query with stored identification information.

15. The computing device of claim 9, wherein when the query is received, the query is displayable on an access device connected to the network.

16. The computing device of claim 9, further comprising instructions, which when executed by the one or more processors, cause the computing device to perform operations including:
   transmitting a setup beacon including information identifying the new network device.

17. A computer-program product tangibly embodied in a non-transitory machine-readable storage medium, including instructions configured to cause a data processing apparatus to:
   receive, at a new network device, credentials identifying an existing network device in a network;
   transmit a query, wherein the query includes a request to identify identification information associated with the new network device;
   receive a response to the query;
   determine that the response to the query includes accurate identification information associated with the new network device; and
   establish a connection with the existing network device on the network using the received credentials.

18. The computer-program product of claim 17, further comprising instructions configured to cause the data processing apparatus to:
   generate a setup access point;
   receive a request for an existing network device to connect to the setup access point; and
   establish a connection with the existing network device.

19. The computer-program product of claim 17, wherein the query is an authentication query configured to confirm an identification of a recipient of the query.

20. The computer-program product of claim 17, further comprising instructions configured to cause the data processing apparatus to:
   transmit a communication including an indication that the new network device will, based on the received response to the query, join the network.

21. The computer-program product of claim 17, further comprising instructions configured to cause the data processing apparatus to:
   transmit a communication including an indication that the new network device will not, based on the received response to the query, join the network.

22. The computer-program product of claim 17, wherein determining that the response to the query includes accurate identification information includes comparing the received response to the query with stored identification information.

23. The computer-program product of claim 17, wherein when the query is received, the query is displayable on an access device connected to the network.

24. The computer-program product of claim 17, further comprising instructions configured to cause the data processing apparatus to:
   transmit a setup beacon including information identifying the new network device.

* * * * *